US012659922B2

(12) United States Patent
Yerramalli et al.

(10) Patent No.: US 12,659,922 B2
(45) Date of Patent: Jun. 16, 2026

(54) REFERENCE LOCATION DEVICE CAPABILITY CONFIGURATION

(71) Applicant: QUALCOMM Incorporated, San Diego, CA (US)

(72) Inventors: Srinivas Yerramalli, San Diego, CA (US); Alexandros Manolakos, Escondido, CA (US); Mukesh Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/554,097

(22) PCT Filed: May 6, 2022

(86) PCT No.: PCT/US2022/028001
§ 371 (c)(1),
(2) Date: Oct. 5, 2023

(87) PCT Pub. No.: WO2022/260787
PCT Pub. Date: Dec. 15, 2022

(65) Prior Publication Data
US 2024/0373399 A1 Nov. 7, 2024

(30) Foreign Application Priority Data
Jun. 10, 2021 (GR) .............................. 20210100380

(51) Int. Cl.
*H04W 64/00* (2009.01)
*H04L 5/00* (2006.01)
(Continued)

(52) U.S. Cl.
CPC ......... *H04W 64/006* (2013.01); *H04L 5/0051* (2013.01); *H04W 60/00* (2013.01); *H04W 72/231* (2023.01)

(58) Field of Classification Search
CPC . H04W 64/006; H04W 60/00; H04W 72/231; H04W 64/00; H04W 24/08; H04W 24/10; H04L 5/0048; H04L 5/0051
(Continued)

(56) References Cited

U.S. PATENT DOCUMENTS 12,047,899 B2 * 7/2024 Khoryaev ............. H04L 5/0048
2019/0037529 A1 1/2019 Edge et al.
(Continued)

FOREIGN PATENT DOCUMENTS

WO 2020068331 A1 4/2020
WO WO-2021197378 A1 * 10/2021 ........ H04W 36/0088
WO WO-2022184227 A1 * 9/2022 ............. H04W 8/22

OTHER PUBLICATIONS

CATT: "Summary #2 of UE and gNB Measurements for NR Positioning", 3GPP TSG RAN WG1 #98bis, R1-1911625, FL Summary of NR POS Measurements Revision of RI-1911531, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 22, 2019, XP051798971, pp. 1-33.
(Continued)

*Primary Examiner* — Rownak Islam
(74) *Attorney, Agent, or Firm* — Thien T. Nguyen

(57) ABSTRACT

Techniques are provided for configuring a user equipment (UE) to operate as a reference node. An example method of operating a user equipment as a reference node includes providing an indication of one or more reference node configuration options to a network entity, the one or more reference node configuration options comprising a registration configuration option indicating the user equipment is registered on a network as a reference node and a regular user equipment, receiving an indication to obtain positioning measurements based on the one or more reference node
(Continued)

configuration options, obtaining one or more positioning measurements, and reporting the one or more positioning measurements to a positioning entity.

28 Claims, 17 Drawing Sheets

(51) Int. Cl.
    *H04W 60/00*        (2009.01)
    *H04W 72/231*       (2023.01)

(58) Field of Classification Search
    USPC .......................................................... 370/329
    See application file for complete search history.

(56) References Cited

U.S. PATENT DOCUMENTS

2021/0088623 A1      3/2021  Yerramalli et al.
2023/0189199 A1*     6/2023  Hao ................... H04W 64/003
                                                       455/456.1

OTHER PUBLICATIONS

International Search Report and Written Opinion—PCT/US2022/028001—ISA/EPO—Jul. 26, 2022.
Qualcomm Incorporated: "Maintenance on DL Reference Signals for NR Positioning", 3GPP Draft, R1-2004469, 3GPP TSG RAN WG1 #101-e, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886198, pp. 1-5, sections 1, 3 and 5.

* cited by examiner

1200 gNB1
1202 gNB2
1204

1208

1206

1206

1208

1208

1205

Reference
node

1210

1212

LMF

Regular mode

Reference node mode

Two Example Operation Modes

1400

| Configuration Option | Regular Mode | Reference Node Mode |
|---|---|---|
| Data processing | Higher decode rate | Lower decode rate |
| Multiple measurements | One measurement at a time | Simultaneous measurements |
| Registration | Regular registration | Simultaneous registration |
| Frequency band | Multiband operation | Single band operation |
| Measurement gap | Small MGPs | Large MGPs |
| SRS for positioning | No transmit during MPG | Transmit during MPG |
| Prioritized PRS | RRM higher priority | PRS higher priority |
| Background monitoring | None/hybrid | Active |

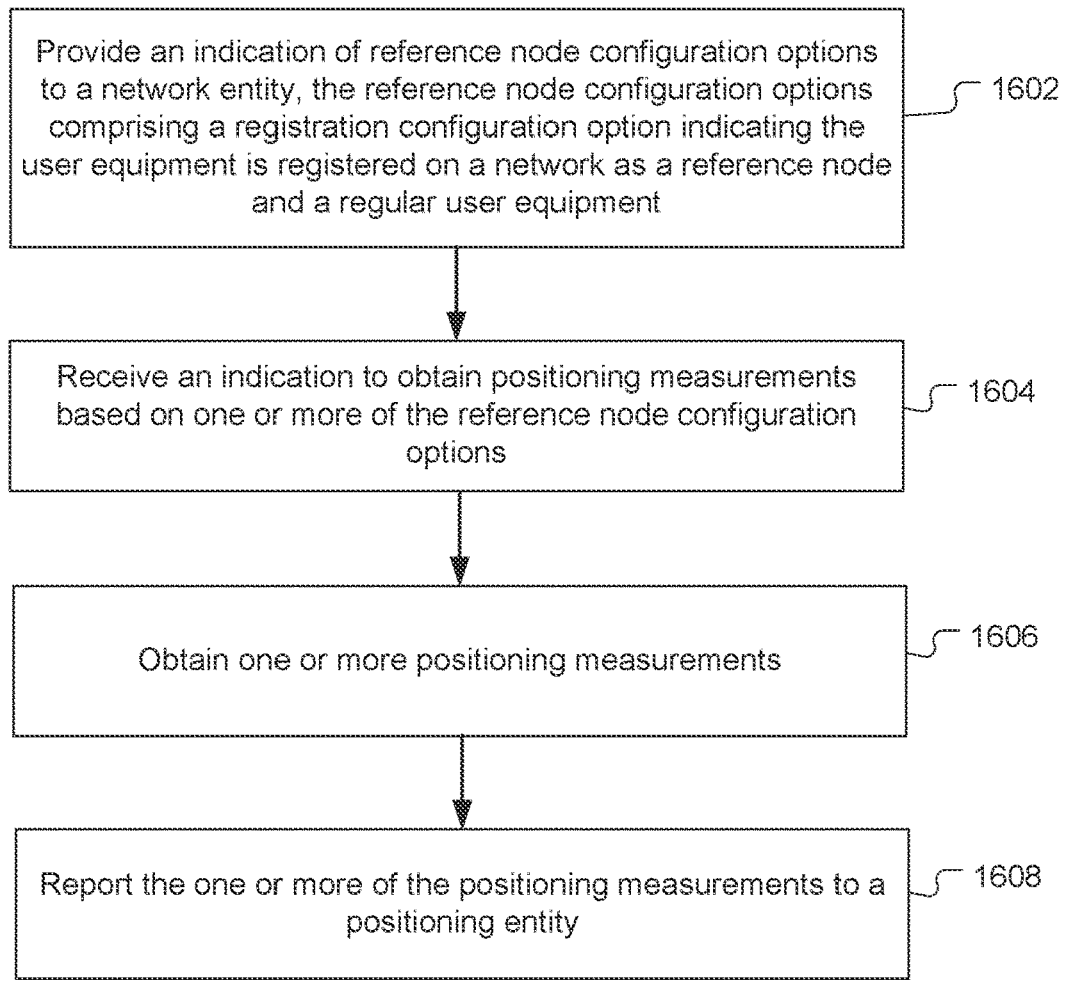

1600

Provide an indication of reference node configuration options to a network entity, the reference node configuration options comprising a registration configuration option indicating the user equipment is registered on a network as a reference node and a regular user equipment
— 1602

Receive an indication to obtain positioning measurements based on one or more of the reference node configuration options
— 1604

Obtain one or more positioning measurements
— 1606

Report the one or more of the positioning measurements to a positioning entity
— 1608

*FIG. 16*

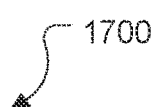

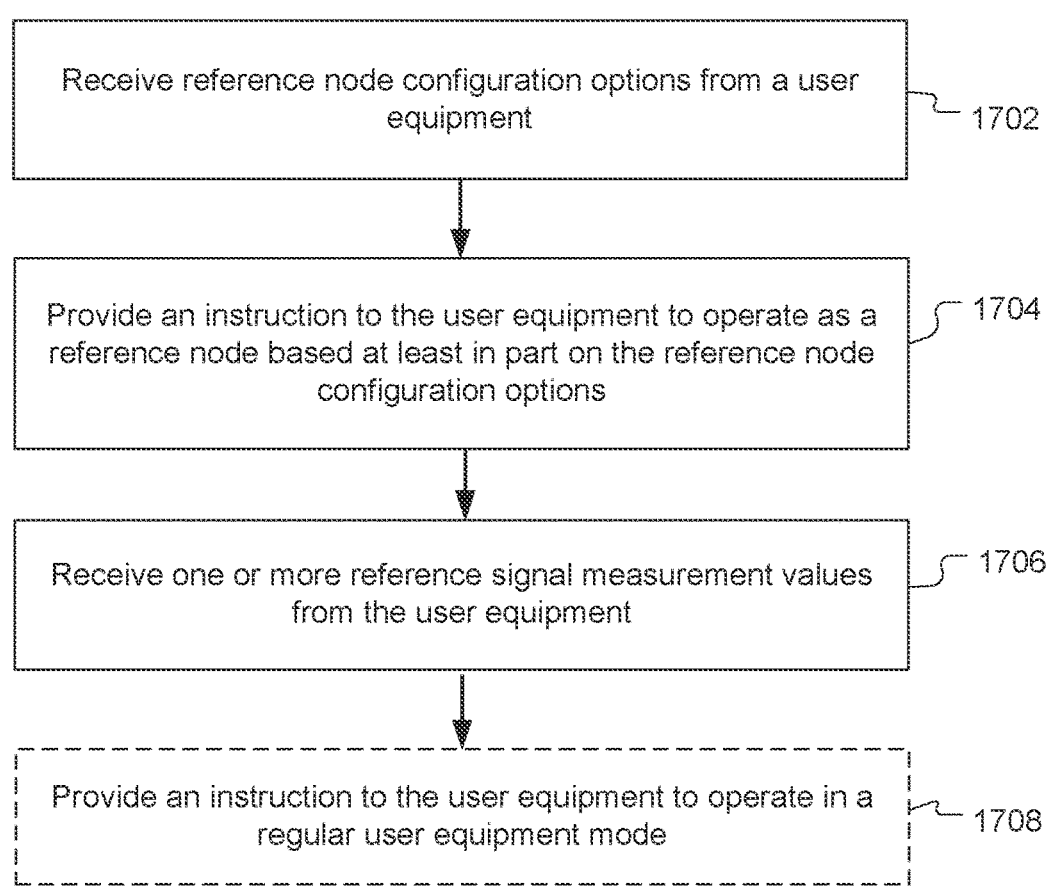

1700

Receive reference node configuration options from a user equipment — 1702

Provide an instruction to the user equipment to operate as a reference node based at least in part on the reference node configuration options — 1704

Receive one or more reference signal measurement values from the user equipment — 1706

Provide an instruction to the user equipment to operate in a regular user equipment mode — 1708

*FIG. 17*

REFERENCE LOCATION DEVICE CAPABILITY CONFIGURATION

This application is the National Stage of International Application No. PCT/US2022/028001, filed May 6, 2022, entitled "REFERENCE LOCATION DEVICE CAPABILITY CONFIGURATION," which claims the benefit of Greek patent application Ser. No. 20210100380, filed Jun. 10, 2021, entitled "REFERENCE LOCATION DEVICE CAPABILITY CONFIGURATION," both of which is are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. In industrial applications, the location of a mobile device may be necessary for asset tracking, robotic control, and other kinematic operations which may require a precise location of an end effector. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements.

SUMMARY

An example method of operating a user equipment as a reference node according to the disclosure includes providing an indication of one or more reference node configuration options to a network entity, the one or more reference node configuration options comprising a registration configuration option indicating the user equipment is registered on a network as a reference node and a regular user equipment, receiving an indication to obtain positioning measurements based on the one or more reference node configuration options, obtaining one or more positioning measurements, and reporting the one or more positioning measurements to a positioning entity.

Implementations of such a method may include one or more of the following features. The one or more reference node configuration options may include a data processing configuration option indicating a decode rate of the user equipment. The one or more reference node configuration options may include a multiple measurement configuration option indicating the user equipment is configured to obtain multiple positioning measurements simultaneously. An on-demand request may be received via a Medium Access Control (MAC) Control Element (CE) configured to active the user equipment as a reference node. The one or more reference node configuration options may include a frequency band configuration option indicating one or more frequency bands to utilize for obtaining the one or more positioning measurements. The one or more reference node configuration options may include a measurement gap period configuration option indicating a measurement gap period for obtaining the one or more positioning measurements. The one or more reference node configuration options may include a sounding reference signal for positioning configuration option indicating the user equipment will transmit a sounding reference signal for positioning during a measurement gap period. The one or more reference node configuration options may include a prioritized positioning reference signal configuration option indicating that the user equipment will prioritize receiving positioning reference signals over radio resource management messages. The one or more reference node configuration options may includes a background mode configuration option indicating the user equipment will only report the one or more positioning measurements when there is relative signal loss of 3 decibels or greater compared to a prior measurement. The indication to obtain the positioning measurements based on the one or more reference node configuration options may include a time duration.

An example method for instructing a user equipment to operate in a reference node mode according to the method includes receiving reference node configuration options from the user equipment, providing an instruction to the user equipment to operate as a reference node based at least in part on the reference node configuration options, and receiving one or more reference signal measurement values from the user equipment.

Implementations of such a method may include one or more of the following features. The reference node configuration options may include a data processing configuration option indicating a decode rate of the user equipment. The reference node configuration options may include a multiple measurement configuration option indicating the user equipment is configured to obtain multiple positioning measurements simultaneously. The reference node configuration options may include a registration configuration option indicating the user equipment is registered on a network as a reference node and a regular user equipment simultaneously. The reference node configuration options may include a frequency band configuration option indicating one or more frequency bands the user equipment will utilize to obtain positioning measurements. The reference node configuration options may include a measurement gap period configuration option indicating a measurement gap period for obtaining the one or more positioning measurements. The reference node configuration options may include a sounding reference signal for positioning configuration option indicating the user equipment will transmit a sounding reference signal for positioning during a measurement gap period. The reference node configuration options may include a prioritized positioning reference signal configuration option indicating that the user equipment will prioritize receiving positioning reference signals over radio resource management messages. The reference node configuration options may include a background mode configuration option indicating the user equipment will only report positioning measurements when there is relative signal loss of 3 decibels or greater compared to a prior measurement. The instruction to the user equipment to operate as the reference node may include a time duration. The instruction to the user equipment to operate as the reference node may be included in at least one of a radio resource control message, a medium access control control element, and a downlink control information message. An instruction may be provide to the user equipment to operate in a regular user equipment mode.

An example apparatus according to the disclosure includes a memory, at least one transceiver, at least one processor communicatively coupled to the memory and the at least one transceiver, and configured to provide an indication of one or more reference node configuration options to a network entity, the one or more reference node configuration options comprising a registration configuration option indicating the apparatus is registered on a network as a reference node and a regular user equipment, receive an indication to obtain positioning measurements based on the one or more reference node configuration options, obtain one or more positioning measurements; and report the one or more positioning measurements to a positioning entity.

An example apparatus according to the disclosure includes a memory, at least one transceiver, at least one processor communicatively coupled to the memory and the at least one transceiver, and configured to receive reference node configuration options from a user equipment, provide an instruction to the user equipment to operate as a reference node based at least in part on the reference node configuration options, and receive one or more reference signal measurement values from the user equipment.

Items and/or techniques described herein may provide one or more of the following capabilities, as well as other capabilities not mentioned. A communication network may include reference nodes at known locations to assist with user equipment positioning. Reference signals received by a user equipment and a reference node may be compared to estimate timing and group errors associated with the reference signals. A user equipment at a known location may be configured to operate as a reference node. The user equipment may have configurable options to dedicate an increased amount of resources for positioning applications while in a reference node mode. The user equipment may provide an indication of the possible configuration options to a network server. The network server may instruct the user equipment to operate as a reference node based on the configuration options. The user equipment may resume operation in a regular mode after a set duration of time or a triggering event. The accuracy of network positioning methods may be increased. Other capabilities may be provided and not every implementation according to the disclosure must provide any, let alone all, of the capabilities discussed.

BRIEF DESCRIPTION OF THE DRAWINGS

FIG. 12 is a diagram of an example double difference positioning method with a reference node.

FIG. 14 is an example data structure for reference node configuration options.

FIG. 16 is a process flow for an example method for operating in a reference node mode.

FIG. 17 is a process flow for an example method for instructing a user equipment to operate as a reference node.

DETAILED DESCRIPTION

Techniques are discussed herein for configuring a user equipment (UE) to operate as a reference node. The term reference node and reference location device may be used synonymously herein. A reference node may be a UE, or another station such as a base station (BS) configured to receive positioning reference signals (PRSs) and communicate with a wireless network. The reference node is in a known location relative to other stations and is configured to measure positioning reference signals (PRSs) transmitted by the other stations. Since the distance between the reference node and the other stations is known, the theoretical propagation times for the positioning reference signals is known. Deviations between the theoretical propagation times and the time of flight measured by a reference note may be used to compensate time of flight measurements obtained by a proximate UE with an unknown location. The compensation information may be based on time of arrival (ToA) measurements for a PRS or on reference signal time differences (RSTD) for two or more PRS received by the reference node.

The techniques discussed herein may be utilized to configure a UE to operate as a reference node. A regular UE with a known location (e.g., in a fixed location or obtained via satellite or other precision positioning methods) may be configured to operate as a dedicated reference node for a period of time. While acting as a reference node, the UE may be configured to provide additional positioning measurements to allow network timing and/or angle corrections. For example, various configuration options may enable the UE to utilize multiple positioning methods simultaneously while in a reference node mode. In operation, a network server may provide configuration settings to a UE to instruct the UE to perform as a reference node. The UE may convert back to a regular mode after a duration of time or based on other triggering events (e.g., obstructed signals, changing locations, availability of other reference nodes, etc.). These techniques and configurations are examples, and other techniques and configurations may be used.

Figure 1:
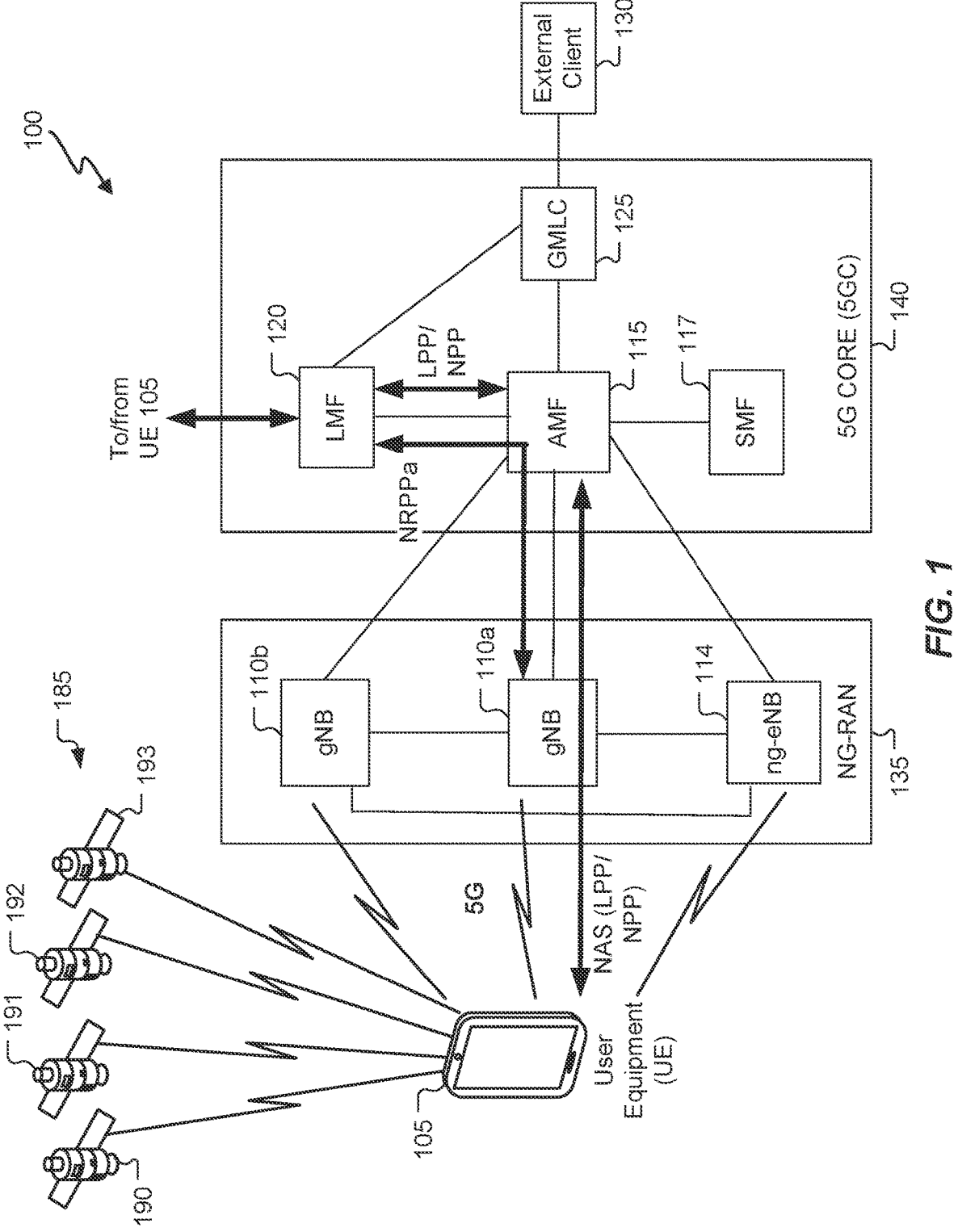
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Further-more, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
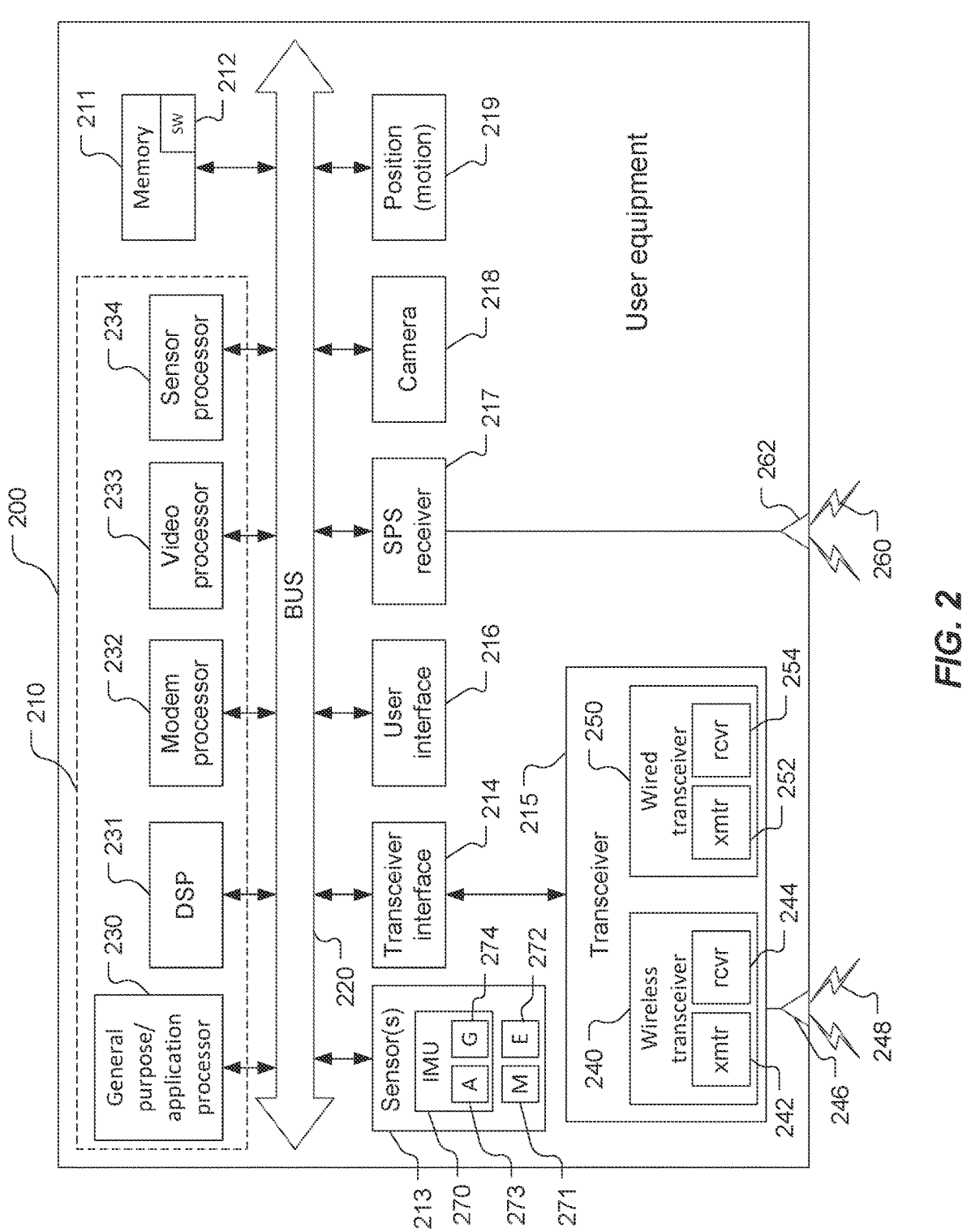
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing, and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the network 135 to send communications to, and receive communications from, the gNB 110_a_, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
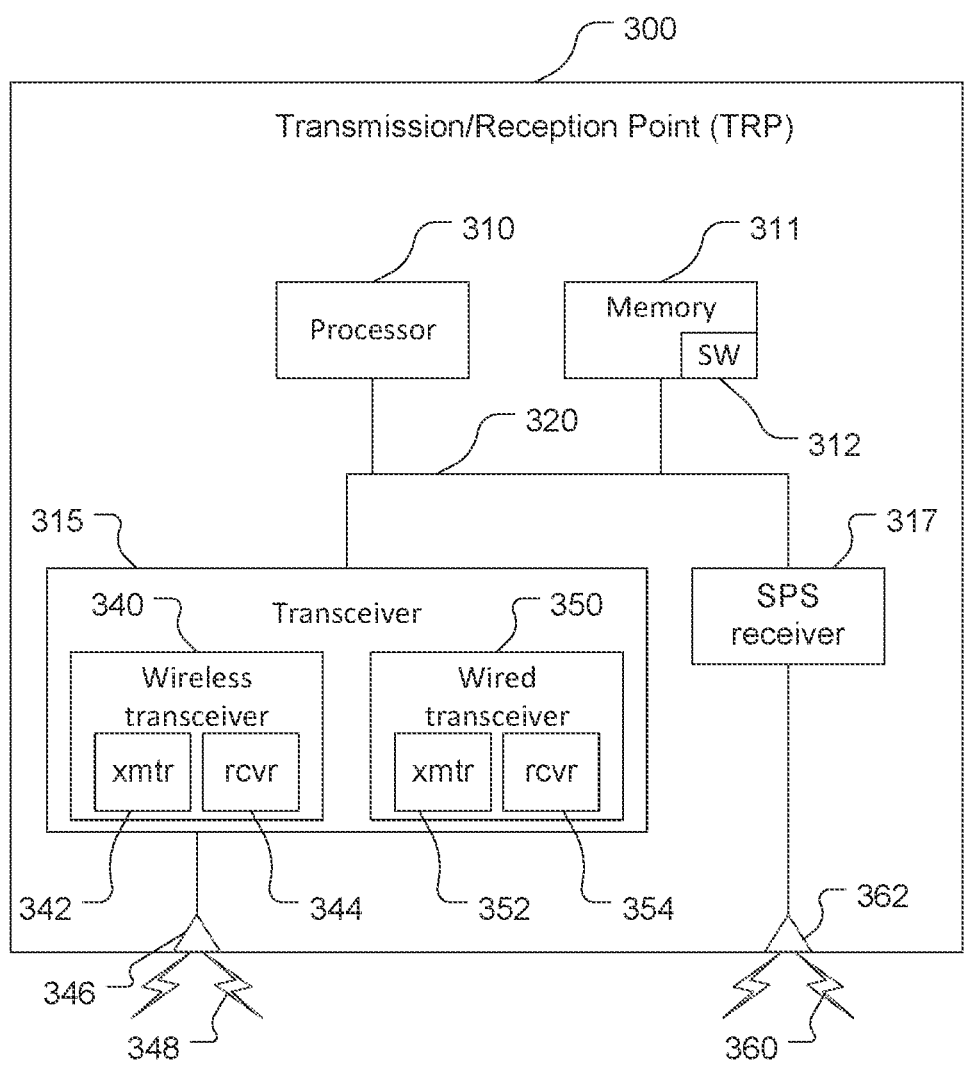
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
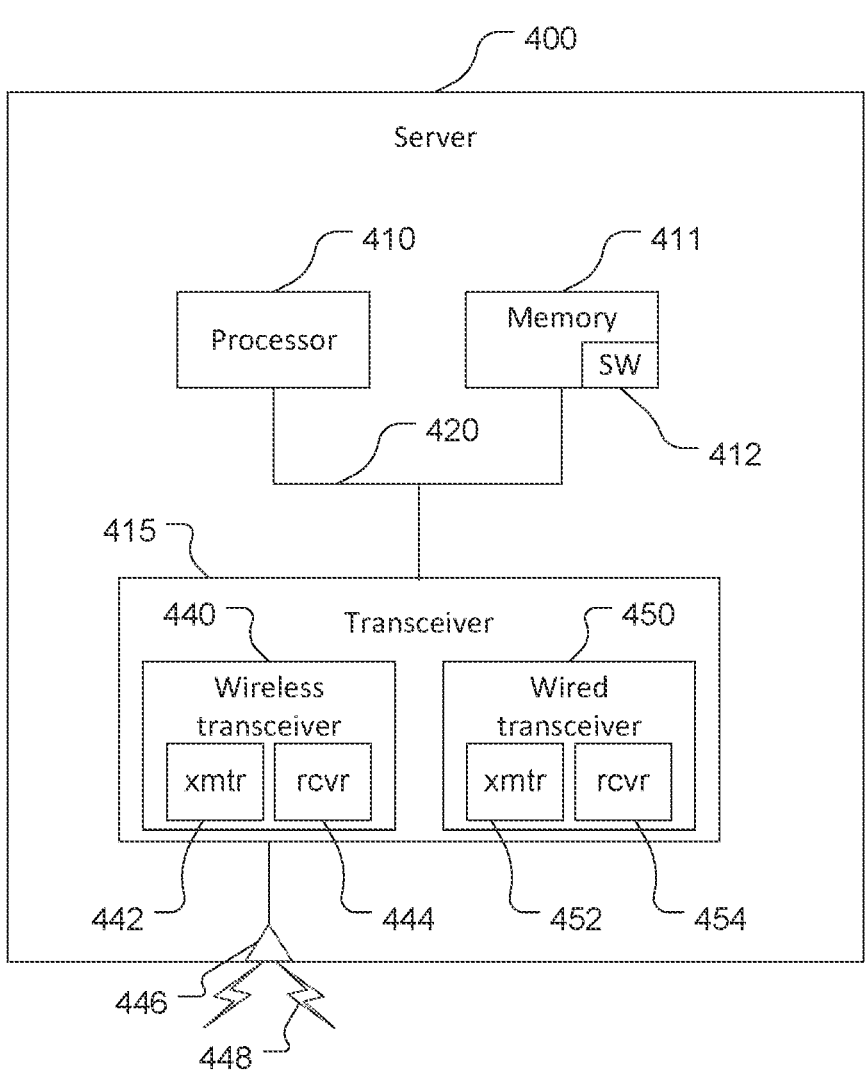
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
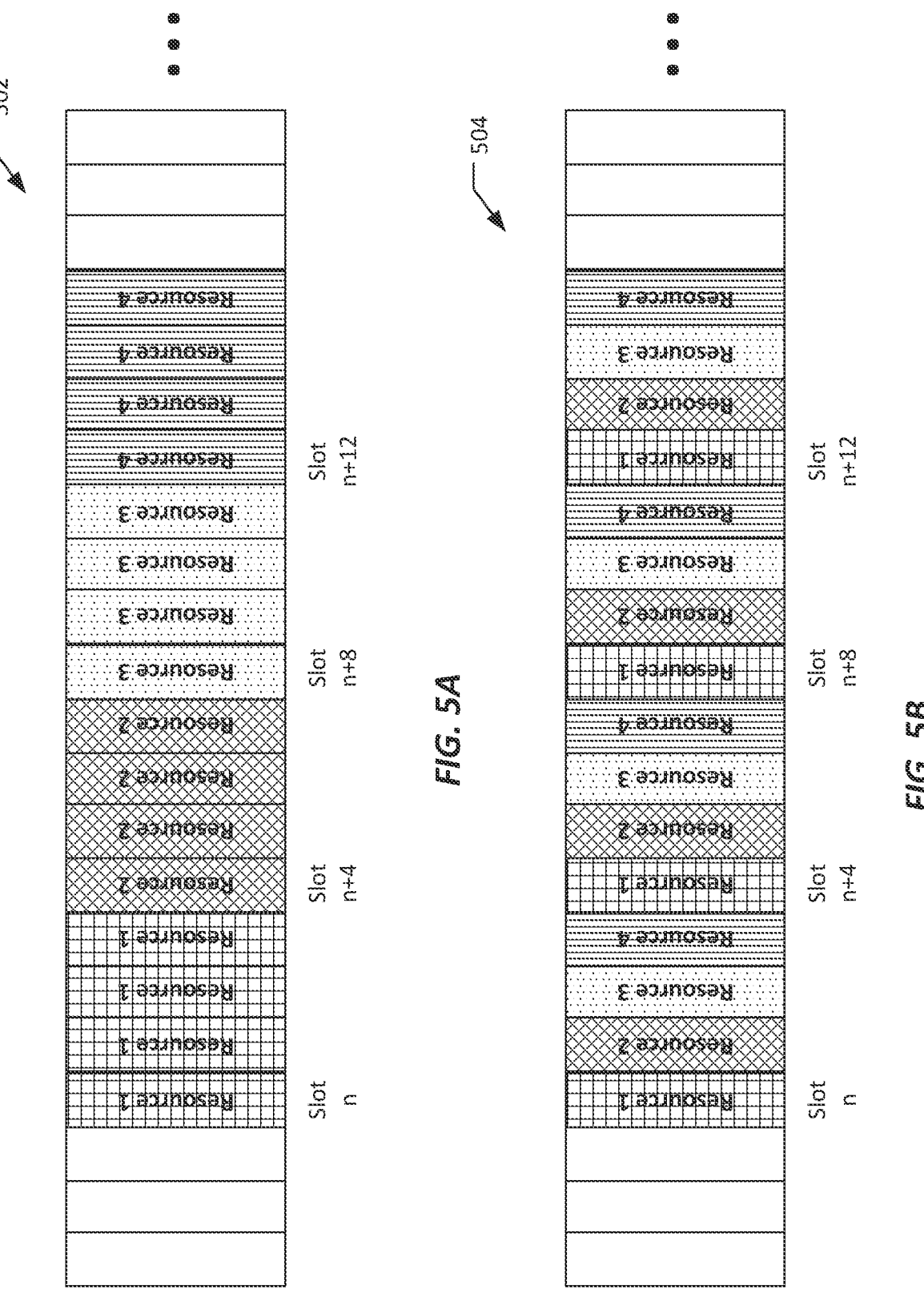
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
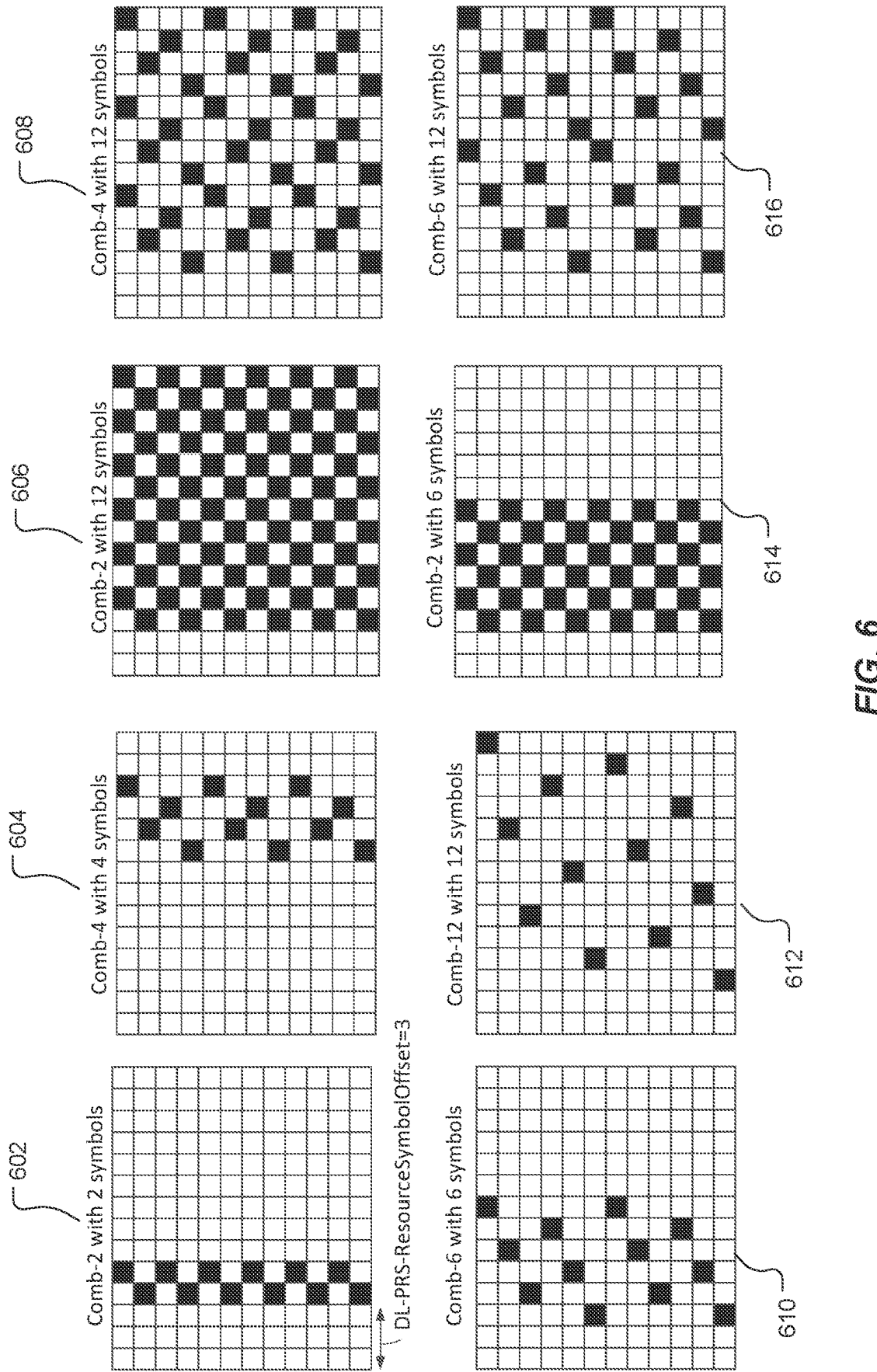
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
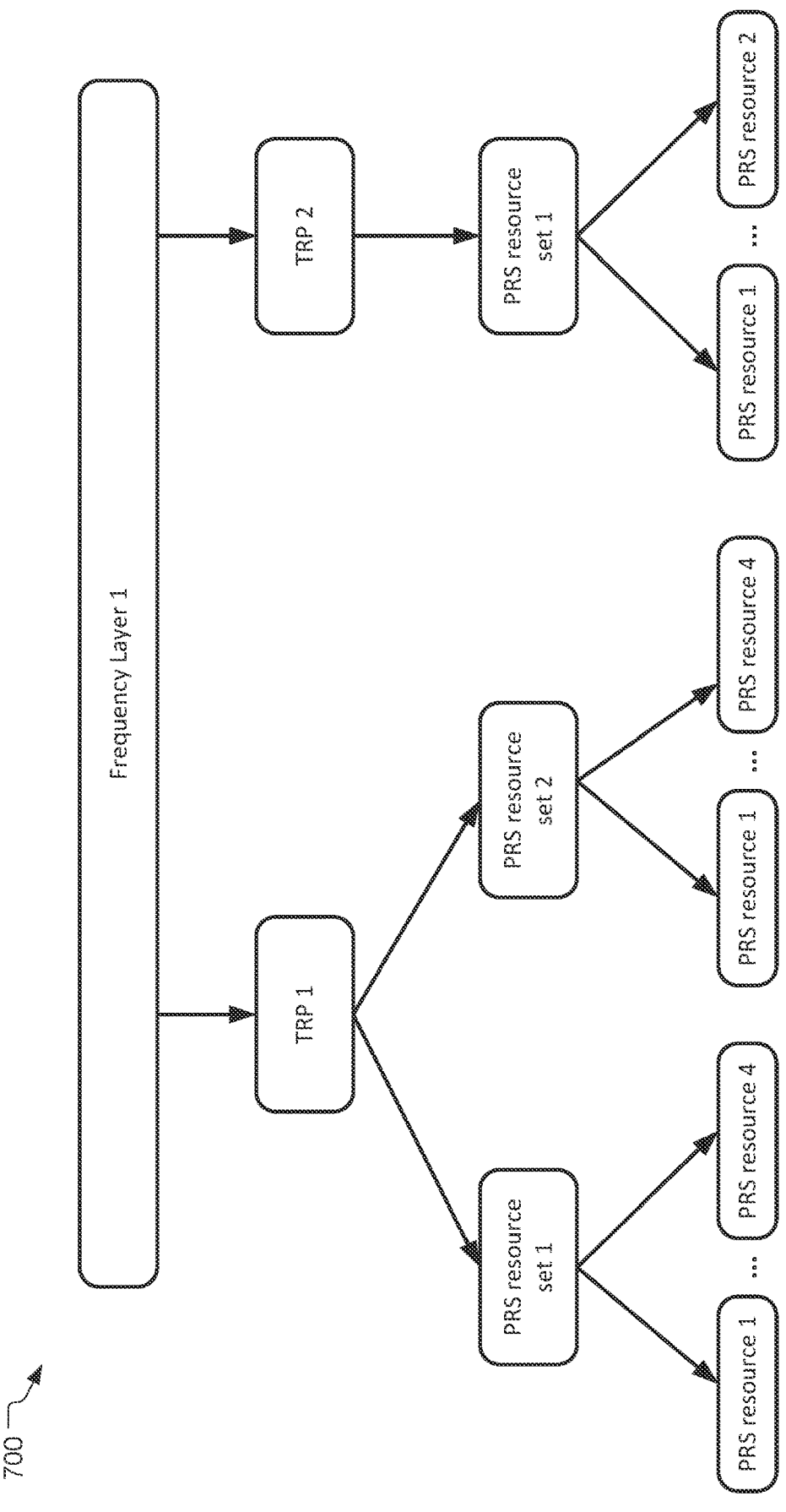
FIG. 7 is a conceptual diagram of an example frequency layer.

Referring to FIG. 7, a conceptual diagram of an example frequency layer 700 is shown. In an example, the frequency layer 700 also referred to as a positioning frequency layer, may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
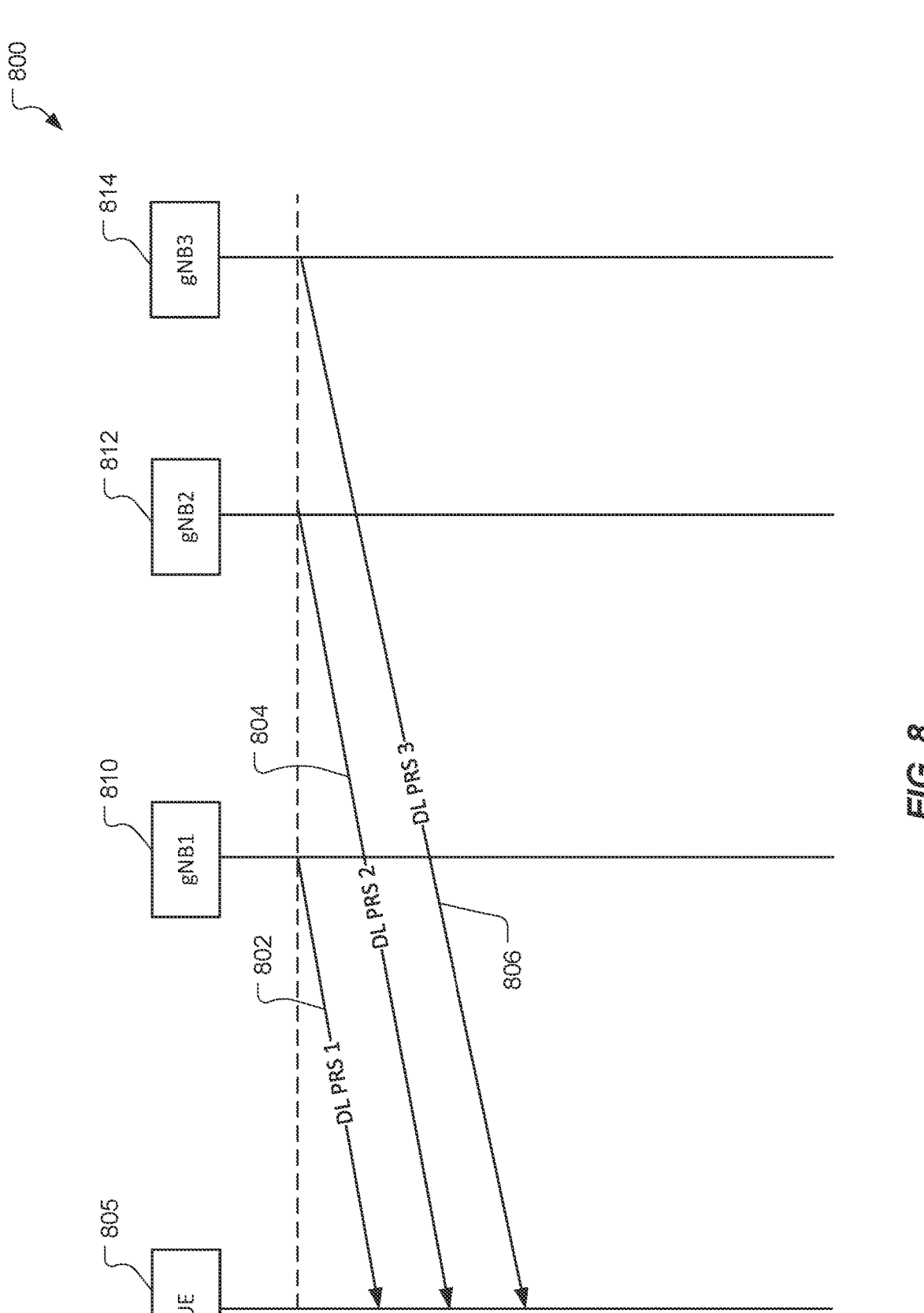
FIG. 8 is an example message flow for a time of arrival based position estimate.

Referring to FIG. 8, an example message flow 800 for time of arrival (ToA) based position flow between a user equipment 805 and a plurality of base stations is shown. The UE 805 is an example of the UE 105, 200 and a first base station 810, a second base station 812 and a third base station 814 are examples of a gNB 110*a-b* or ng-eNB 114. The number of base stations and message formats in the message flow 800 are examples only and not limitations as other numbers and formats may be used. ToA based positioning methods utilize the precise measurements of the arrival time of signals transmitted from one or more base stations to a user equipment, or vice versa. For example, the first base station 810 may be configured to transmit a first DL PRS 802 at time T1, the second base station 812 may be configured to transmit a second DL PRS 804 at time T1, and the third base station 814 may be configured to transmit a third DL PRS 806 at time T1. The transmit times and signal format are examples only to describe the concepts of ToA lateration techniques. The distance between the UE 805 and the respective base stations 810, 812, 814 is based on the propagation time of the respective PRS signals 802, 804, 806. That is, the signals travel with a known velocity (e.g., approximately the speed of light (c) or ~300 meters per microsecond), and the distance can be determined from the elapsed propagation time. ToA based positioning requires precise knowledge of the transmission start time(s), and that all stations are accurately synchronized with a precise time source. Using the propagation speed and measured time, a distance (D) between the UE 805 and respective base station may be expressed as:

$$D = c * (t) \qquad (1)$$

where:
   D=distance (meters);
   c=propagation speed of ~300 meters/microsecond;
   t=time in microseconds.
   For example, the distance between the UE 805 and the first base station 810 is c*(T2–T1), the distance between the UE 805 and the second base station 812 is c*(T3–T1), and the distance between the UE 805 and the third base station 814 is c*(T4–T1). The stations may use other transmission times (i.e., not all stations must transmit at time T1). Using the respective distances as a radius, a circular representation of the area around the base stations may be used to determine a position estimate for the UE 805 (e.g., using trilateration). Additional stations may be used (e.g., using multilateration techniques). ToA positioning methods may be used for two-dimensional as well as three-dimensional position estimates. Three-dimensional resolution can be performed by constructing spherical instead of circular models.

A drawback of ToA positioning methods is the requirement for precise time synchronization of all stations. Even small issues with time synchronization may result in very large errors in the resulting positioning estimates. For example, a time measurement error as small as 100 nanoseconds can result in a localization error of 30 meters. ToA-based positioning solutions are particularly susceptible to outages in station timing sources which may cause a base station to lose time synchronization. Other positioning techniques, such as round trip timing (RTT) and Angle of Arrival (AoA) are less dependent on station time synchronization.

Figure 9:
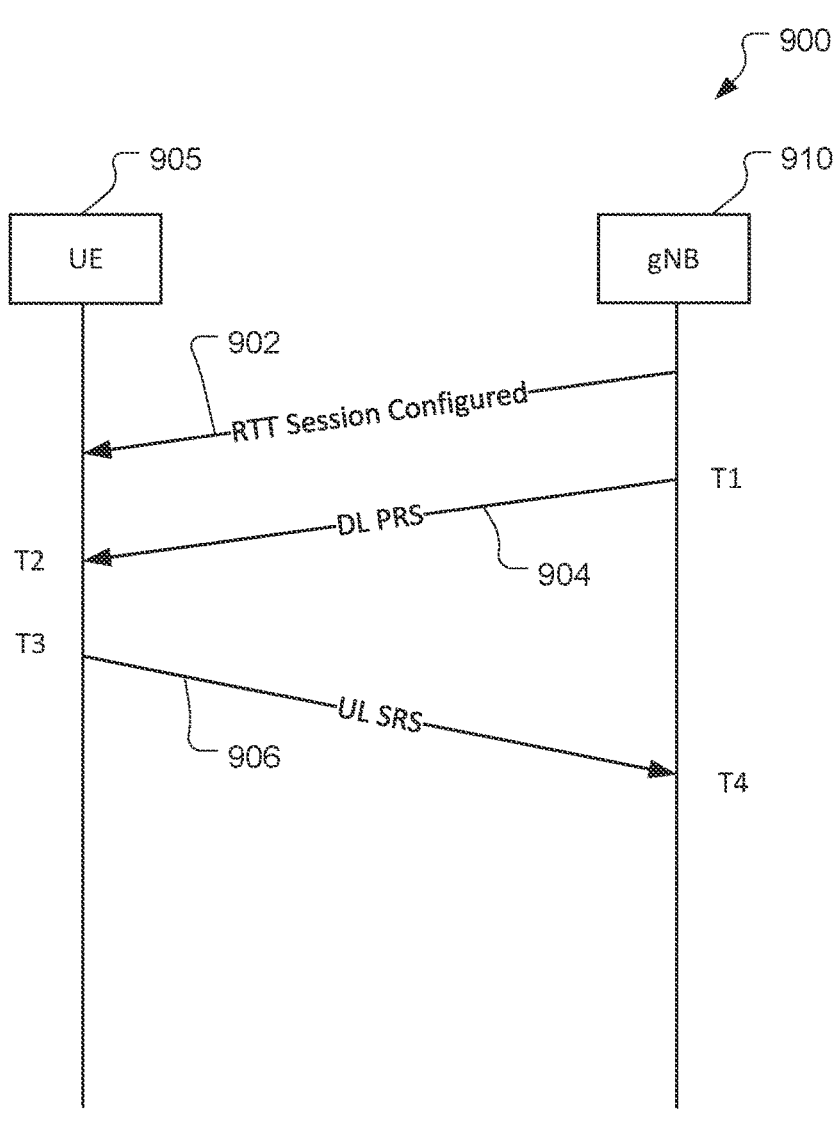
FIG. 9 is an example round trip time message flow between a user equipment and a base station.

Referring to FIG. 9, an example round trip message flow 900 between a user equipment 905 and a base station 910 is shown. The UE 905 is an example of the UE 105, 200 and the base station 910 may be a gNB 110*a-b* or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 900 may be initiated by the base station 910 with a RTT session configured message 902. The base station may utilize the LPP/NRPPa messaging to configure the RTT session. At time T1, the base station 910 may transmit a DL PRS 904, which is received by the UE 905 at time T2. In response, the UE 905 may transmit a Sounding Reference Signal (SRS) for positioning message 906 at time T3 which is received by the base station 910 at time T4. The distance between the UE 905 and the base station 910 may be computed as:

$$\text{distance} = \frac{c}{2}((T4 - T1) - (T3 - T2)) \tag{2}$$

where c=speed of light.

Since the UE 905 and base station 910 are exchanging messages, which may include timing information, the impact of a timing offset between the stations may be minimized. That is, the RTT procedures may be used in asynchronous networks. A drawback to RTT procedures, however, is that in dense operating environments, where there are many UEs exchanging RTT messages with base stations, the bandwidth required for the UL SRS for positioning messages may increase the messaging overhead and utilize excess network bandwidth. In this use case, passive positioning techniques may reduce the bandwidth required for positioning by eliminating transmissions from the UE.

Figure 10:
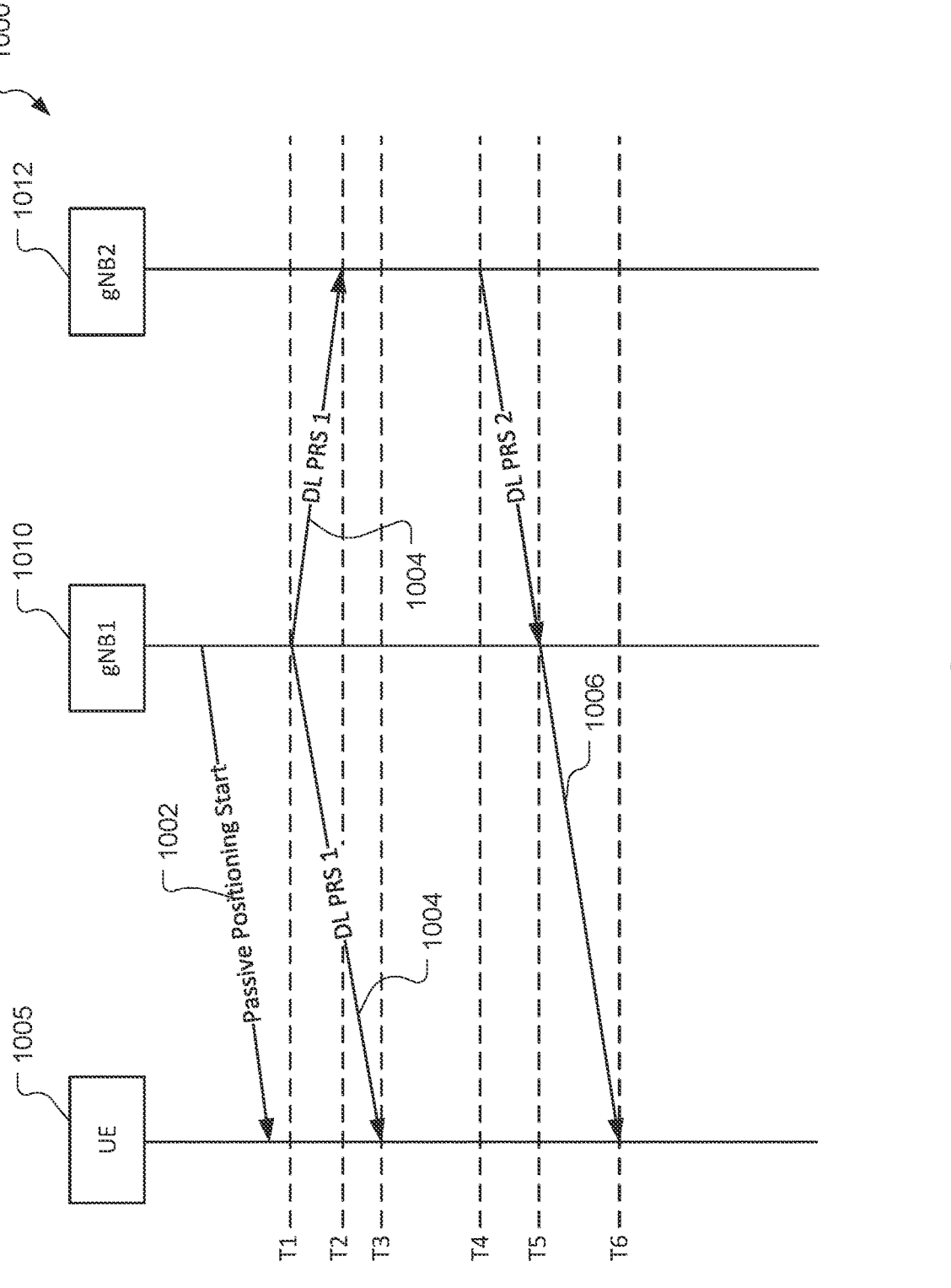
FIG. 10 is an example message flow for passive positioning of a user equipment.

Referring to FIG. 10, an example message flow 1000 for passive positioning of a user equipment 1005 is shown. The message flow includes the UE 1005, a first base station 1010 and a second base station 1012. The UE 1005 is an example of the UEs 105, 200, and the base stations 1010, 1012 are examples of the gNBs 110*a-b* or ng-eNB 114. In general, TDOA positioning techniques utilize the difference in travel times between one entity and other entities to determine relative ranges from the other entities and those, combined with known locations of the other entities, may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 1010 may provide a passive positioning start message 1002 to the UE 1005. The passive positioning start message 1002 may be a broadcast message, or other signaling such as RRC, to inform the UE of a PRS transmission schedule and may include transmission information (e.g., channel information, muting patterns, PRS bandwidth, PRS identification information, etc.). At time T1, the first station may transmit a first DL PRS 1004 which may be received by the second base station 1012 at time T2 (for example), and by the UE 1005 at time T3. The second base station 1012 may be configured to transmit a second DL PRS 1006 at time T4, which is received by the first base station 1010 at time T5 and by the UE 1005 at time T6. The time between T2 and T4 may be a configured turnaround time on the second base station 1012 and thus a known period of time. The time between T1 and T2 (i.e., time of flight) may also be known because the first and second base stations 1010, 1012 are in fixed locations. The turnaround time (i.e., T4–T2) and the time of flight (i.e., T2–T1) may be broadcast or otherwise provided to the UE 1005 for use in positioning calculations. The UE 1005 may observe the difference between T6 and T3, and the distances may be computed as:

$$D_{gNB1-UE} = \frac{c}{2}((T_3 - T_1)) \tag{3}$$

$$D_{gNB2-UE} = \frac{c}{2}((T_6 - T_1) - (T_4 - T_2) - (T_2 - T_1)) = \frac{c}{2}(T_6 - T_4) \tag{4}$$

$$D_{gNB2-UE} - D_{gNB1-UE} = \frac{c}{2}(T_6 - T_3) - (T_4 - T_2) - (T_2 - T_1)\Big) \tag{5}$$

In operation, in an example, the base stations 1010, 1012 may utilize synchronized timing to compute the time of flight values. In an example, the first DL PRS 1004 and the second DL PRS 1006 may include timing information (such as in the RTT message flow 900) and thus may reduce the impact of a timing offset between the stations.

Figure 11:
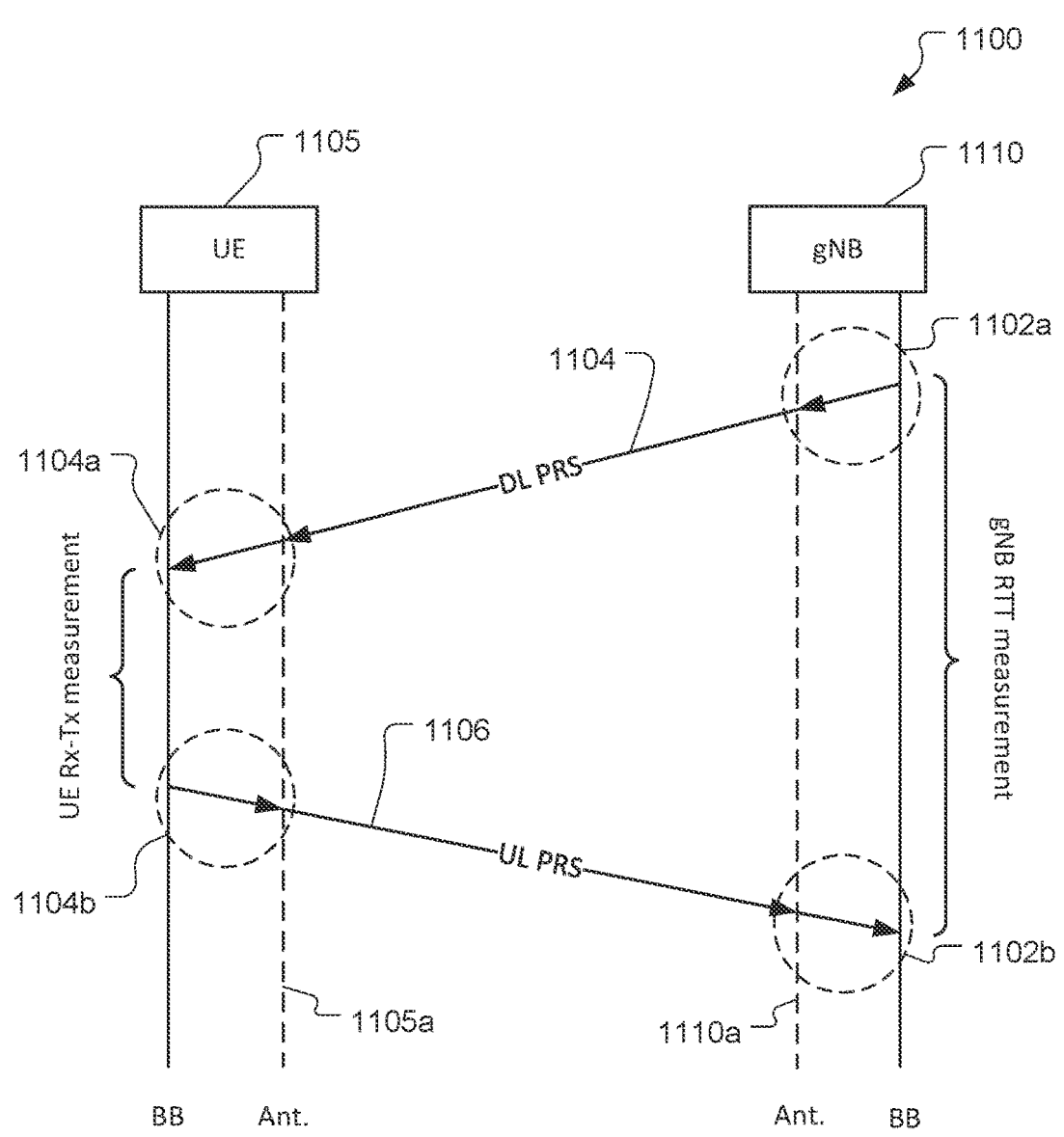
FIG. 11 is a diagram of example impacts of group delay errors in wireless transceivers.

Referring to FIG. 11, a diagram 1100 of example impacts of group delay errors within wireless transceivers are shown. The diagram 1100 depicts an example RTT exchange such as described in FIG. 9. A UE 1105, such as the UE 200, and a base station 1110, such as the gNB 110*a*, are exchanging positioning reference signals such as a downlink (DL) PRS 1104 and an uplink (UL) PRS 1106 (which may also be an UL SRS). The UE 1105 may have one or more antennas 1105*a* and associated base band processing components. Similarly, the base station 1110 may have one or more antennas 1110*a* and base band processing components. The respective internal configurations of the UE 1105 and the base station 1110 may cause delay times associated with the transmission and reception of PRS signals. In general, a group delay is a transit time of a signal through a device versus frequency. For example, a $BS_{TX}$ group delay 1102*a* represents the difference in time the base station 1110 records the transmission of the DL PRS 1106 and the time the signal leaves the antenna 1110a. A $BS_{RX}$ group delay 1102b represents the difference in time the UL PRS 1106 arrives at the antenna 1110a and the time the processors in the base station 1110 receive an indication of the UL PRS 1106. The UE 1105 has similar group delays such as the $UE_{RX}$ group delay 1104a and the $UE_{TX}$ group delay 1104b. The group delays associated with the network stations may create a bottleneck for terrestrial based positioning because the resulting time differences lead to inaccurate position estimates. For example, a 10 nanosecond group delay error equates to approximately a 3 meter error in the position estimate. Different frequencies may have different group delay values in a transceiver, thus different PRS resources may have different group delays. The double difference positioning methods described herein may reduce the impact of the group delays associated with network stations through the use of one or more reference nodes configured to determine the errors associated with PRS resources transmitted by network stations.

Figure 12:
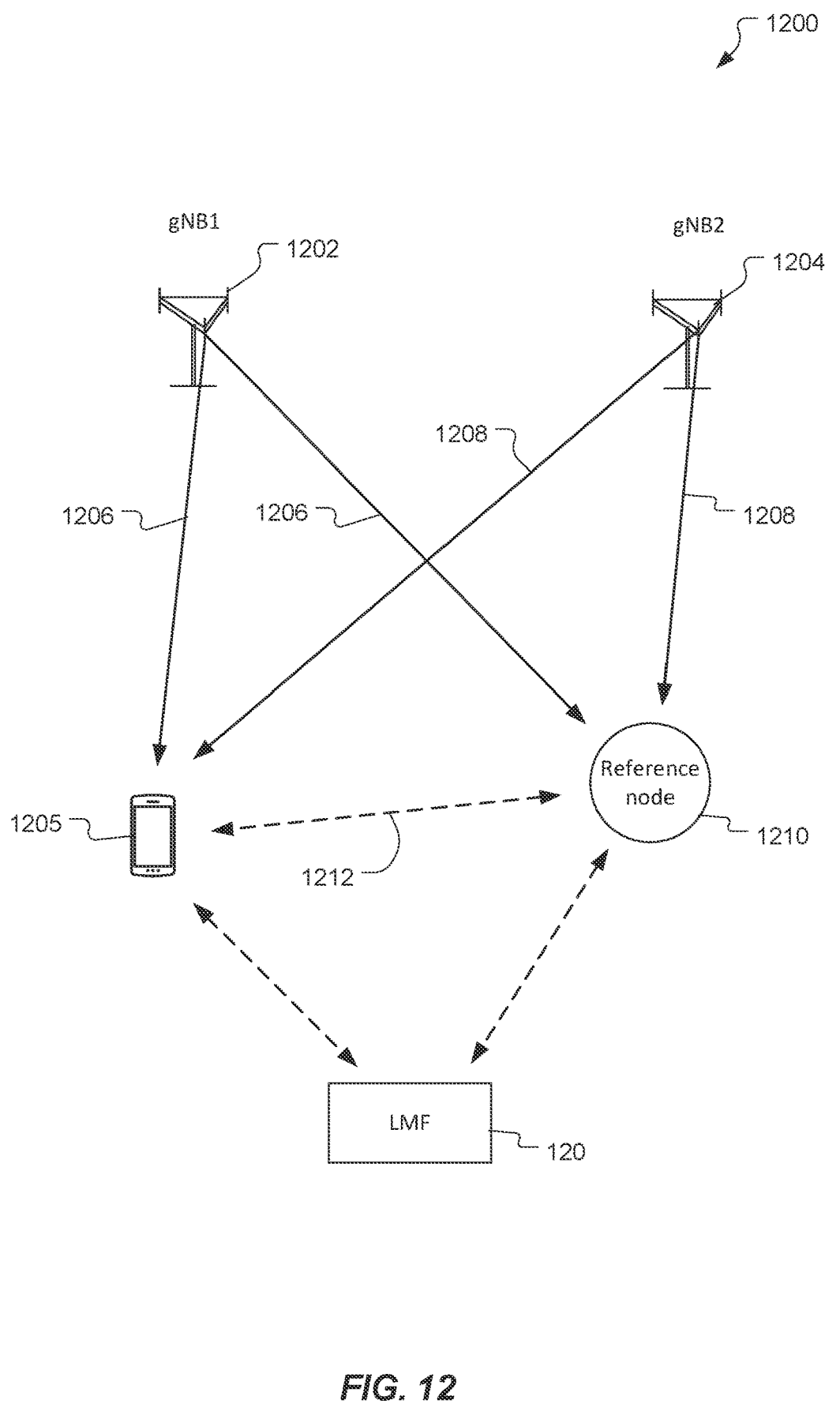

Referring to FIG. 12, a diagram 1200 of an example double difference positioning method is shown. The diagram 1200 includes a first base station 1202, a second base station 1204, a target UE 1205, and a reference node 1210. The base stations 1202, 1204 may be considered examples of the TRP 300, such as the gNBs 110a, 110b. The target UE 1205 may include at least some of the components of the UE 200 and may be considered an example of the UE 200. The reference node 1210 may include components of the UE 200 and/or the TRP 300 and may be an example of either a UE 200 or a TRP 300, or another device configured to operate in a reference node mode and communicate in the communication system 100. For example, the target UE 1205 and the reference node 1210 may be configured to communicate with a network entity such as the LMF 120 via one or more communication protocols. (e.g., via NRPPa, LPP, etc.). In an example, the target UE 1205 and the reference node 1210 may be configured to communicate via device-to-device (D2D) link 1212. The D2D link 1212 may be based on technologies such as NR sidelink (e.g., via the physical sidelink control channel (PSCCH), physical sidelink shared channel (PSSCH)). In a vehicle-to-everything (V2X) network, the reference node 1210 may be a roadside unit (RSU), and the sidelink may be based on the PC5 protocol. Other D2D technologies may also be used.

In operation, the first base station 1202 is configured to transmit PRS resources such as a first PRS 1206 which is received by both the target UE 1205 and the reference node 1210. Preferably, the same instance of the first PRS 1206 received by the UE 1205 and reference node 1210, but different instances of the first PRS 1206 may be received by the UE 1205 and the reference node 1210. The second base station 1204 is configured to transmit PRS resources such as one or more instances of a second PRS 1208 which is received by both the target UE 1205 and the reference node 1210. The first and second PRS 1206, 1208 may be in the same or different positioning frequency layers. Since the reference node 1210 is in a known location, the expected time of arrivals (ToAs) and the reference signal timing difference (RSTD) for the first and second PRSs 1206, 1208 are known based on the propagation time of the RF signals. A delay in the actual measurements as compared to the expected ToAs may be used to determine the group delay associated with the PRSs 1206, 1208. This computed delay value may be used to compensate measurements of the PRSs 1206, 1208 for proximate mobile devices, such as the target UE 1205. In an example, the reference node 1210 may provide the compensation values associated with the first and second PRS 1206, 1208 to the LMF 120, and the target UE 1205 may obtain the compensation values from the LMF 120. In an example, the reference node 1210 may provide the compensation values via the D2D link 1212.

In an ideal installation, the reference node 1210 will have a fixed and accurate location, and will be in a position to receive all PRS being transmitted by the network stations and received by the UEs in the network. In practice, however, these conditions may not be satisfied. Variations may include, for example, the reality that a single reference node 1210 may not be able to measure all transmitted PRS. For example, due to scheduling conflicts, power consumption limitations, signal obstructions, frequency and bandwidth capabilities, etc. In another example, the reference node 1210 and the target UE 1205 may not be in positions to measure the same instance of PRSs transmitted by the base stations. The location of the reference node 1210 may change without a corresponding change to the ToA model. The ability to configure a regular UE to perform the function of a reference node provides the technical advantage of enabling new reference nodes in a network when the previously configured reference nodes cannot receive PRS. The increased number of reference nodes may increase the reliability and accuracy of the resulting position estimates.

Figure 13:
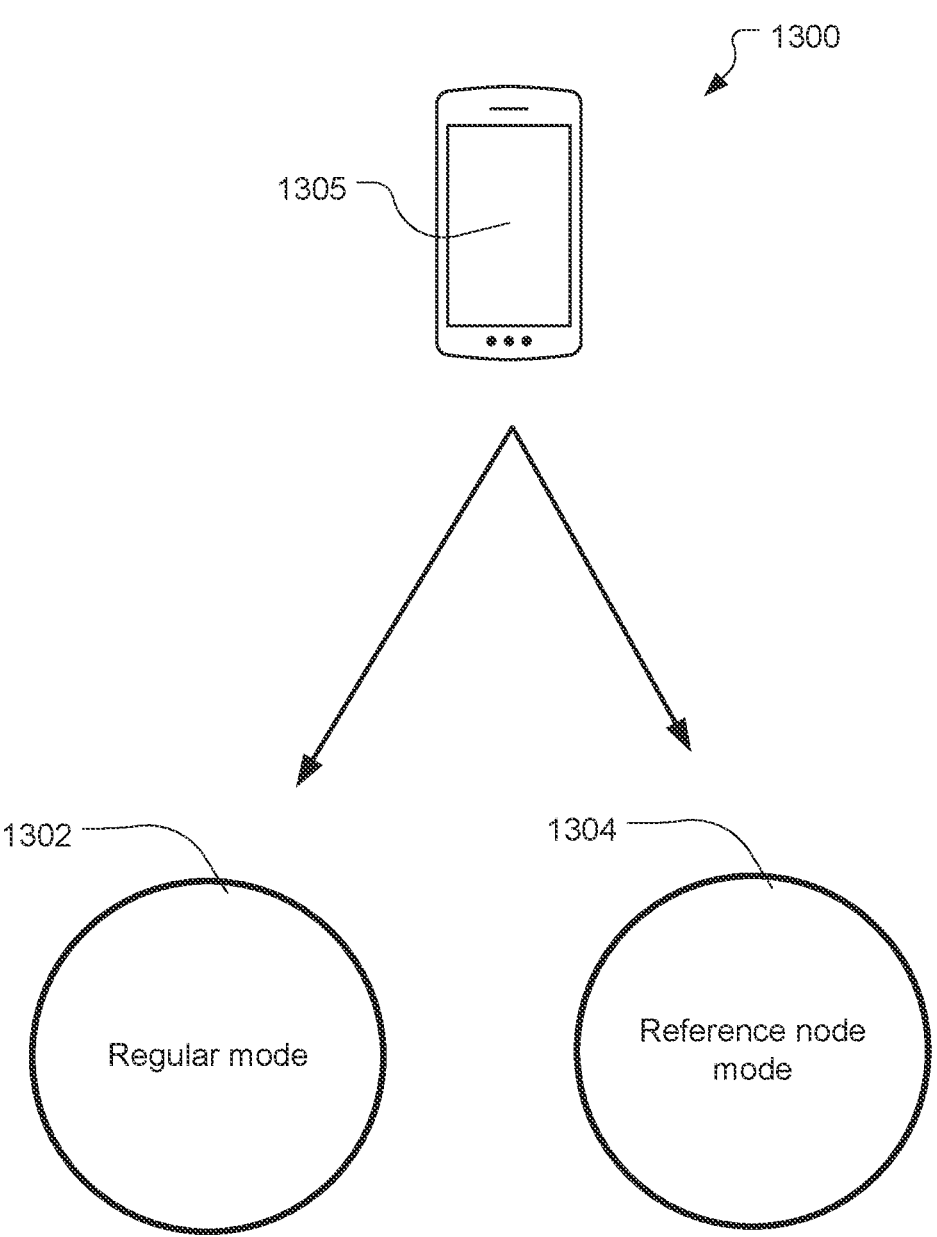
FIG. 13 is a diagram of two example modes of operation with a user equipment.

Referring to FIG. 13, with further reference to FIG. 12, a diagram 1300 of two example modes of operation with a user equipment 1305 is shown. The UE 1305 may include some or all of the components of the UE 200, and the UE 200 may be an example of the UE 1305. The UE 1305 may be configured to operate in at least two modes including a regular mode 1302 and a reference node mode 1304. In general, when operating in the reference node mode 1304, the processing and communication capabilities of the UE 1305 are biased towards obtaining and reporting reference signal measurements and the UE 1305 may be configured to perform the functions of the reference node 1210 in FIG. 12. The UE 1305 may have various configurable settings which may be used to improve the positioning capabilities of the UE 1305 when in the reference node mode 1304. For example, the UE 1305 may be configured to support decoding X Gbps while in the regular mode 1302 and then support a lower amount of decoding while in the reference node mode. The decrease in decoding capability may conserve processor capabilities for reference signal measurement and reporting. Similarly the ultra-reliable low-latency communications (URLLC) capabilities of the UE 1305 in the regular mode 1302 may not be supported while in the reference node mode 1304. In an example, the UE 1305 may be configured to support one measurement method at a time while in the regular mode 1302, but may be configured to support more than one measurement method simultaneously while in the reference node mode 1304. In an embodiment, the UE 1305 may be simultaneously registered as a reference UE and a regular UE. The reference node mode 1304 may be activated using radio signaling from a network entity such as a gNB 110a-b or the LMF 120. In an example, the reference node mode 1304 may be activated via Radio Resource Control (RRC) messaging, or via an on-demand request using Medium Access Control (MAC) control elements (CE), Downlink Control Information (DCI), or other signaling techniques within a positioning session. The indicated capabilities of the UE 1305 may be joint capabilities for both regular and reference mode operation, in addition to capabilities for individual operation.

In an embodiment, the UE 1305 may indicate which frequency bands may be used when operating in the reference node mode 1304. For example, the UE 1305 may be configured to utilize both FR-1 and FR-2 while in the regular mode 1302, but may be limited to FR-1 while in the reference node mode 1304. The UE 1305 may utilize larger measurement gap periods (MGPs) (e.g., several hundred milliseconds as compared to tens of milliseconds). The larger MGPs may be used to improve measurements of a larger number of resources within a small period. The set of MGPs supported in the reference node mode 1304 may be different then the set of MGPs defined for the regular mode 1302. In an example, the UE 1305 may be configured to transmit SRS for positioning signals during a MGP while in the reference node mode 1304. This feature may allow the UE 1305 to measure PRS in downlink slots while transmitting SRS for positioning in the designated uplink slots. The decrease in turnaround time between receiving PRS and SRS transmissions may improve the quality of the resulting calibration value. While in the reference node mode 1304, the UE 1305 may be configured to prioritize PRS measurements over Radio Resource Management (RRM) measurements, and prioritize RRM while in the regular mode 1302.

In an embodiment, the UE 1305 may be configured for background monitoring while in regular mode 1302 or while in the reference node mode 1304. In general, the UE 1305 is expected to have line-of-sight (LOS) to different network stations (e.g., gNBs). The UE 1305 may be configured to perform and monitor measurements without reporting the measurements to a network entity (e.g., the LMF 120 or gNB 110a). If the UE 1305 observes a large difference with respect to previous measurements which cannot be attributed to movement of the UE 1305, then the UE 1305 may provide a report to a network entity. The report may be used by the network entity to select another UE to act as a reference node.

Referring to FIG. 14, an example data structure 1400 for reference node configuration options is shown. In general, the data structure 1400 may include a plurality of configuration options 1402 associated with operating the UE 1305 in the regular mode 1302 and the reference node mode 1304. For example, each configuration option 1402 may be associated with one or more regular mode parameters 1404 and reference node mode parameters 1406. The configuration options 1402 and associated parameters in the data structure 1400 are examples, and not limitations as the UE 1305 may have additional configuration options or not all of the example options indicated in FIG. 14, and different parameters may be associated with different configuration options.

In an example, a data processing configuration option 1412 may indicate a higher decode rate for the regular mode 1302 and a relatively lower decode rate for the reference node mode 1304. The data processing configuration option 1412 may also disable or reduce the URLLC capabilities while the UE 1305 is in the reference node mode 1304. A multiple measurements configuration option 1414 may instruct the UE 1305 to support one measurement method at a time while in the regular mode 1302 and more than one measurement method simultaneously while in the reference node mode 1304. A registration configuration option 1416 may instruct the UE 1305 to simultaneously register as a reference UE and a regular UE when in the reference node mode 1304. A frequency band configuration option 1418 may indicate which frequency band(s) may be used when operating in the respective regular mode 1302 and the reference node mode 1304. A measurement gap configuration option 1420 may indicate the measurement gap periods (MGPs) for the respective modes 1302, 1304. A SRS for positioning configuration option 1422 may indicate that the UE 1305 may transmit SRS for positioning signals during a MGP while in the reference node mode 1304. A prioritized PRS configuration option 1424 may indicate the UE 1305 may prioritize PRS measurements over RRM measurements while in the reference node mode 1304, and prioritize RRM while in the regular mode 1302. A background monitoring configuration option 1426 may indicate whether the UE 1305 should perform and monitor measurements without reporting the measurements to a network entity (e.g., the LMF 120 or gNB 110a). The background monitoring may be active when in the reference node mode 1304 and the UE may report the observations with a large difference with respect to previous measurements. A large difference may be defined as a relative signal loss of 3 dB or greater. A configurable value may be used to define a large difference. The background monitoring may be inactive when in the regular mode 1302. A hybrid background mode may be utilized when the UE 1305 is in the regular mode 1302 such that the observations with large differences will be reported to the network. Other configuration options and parameters may also be included in the data structure 1400 to define the operational parameters for the UE 1305 for each of the regular and reference node modes 1302, 1304. For example, the configuration and capabilities of a UE may impact the number of configuration options and the associated parameters.

Figure 15:
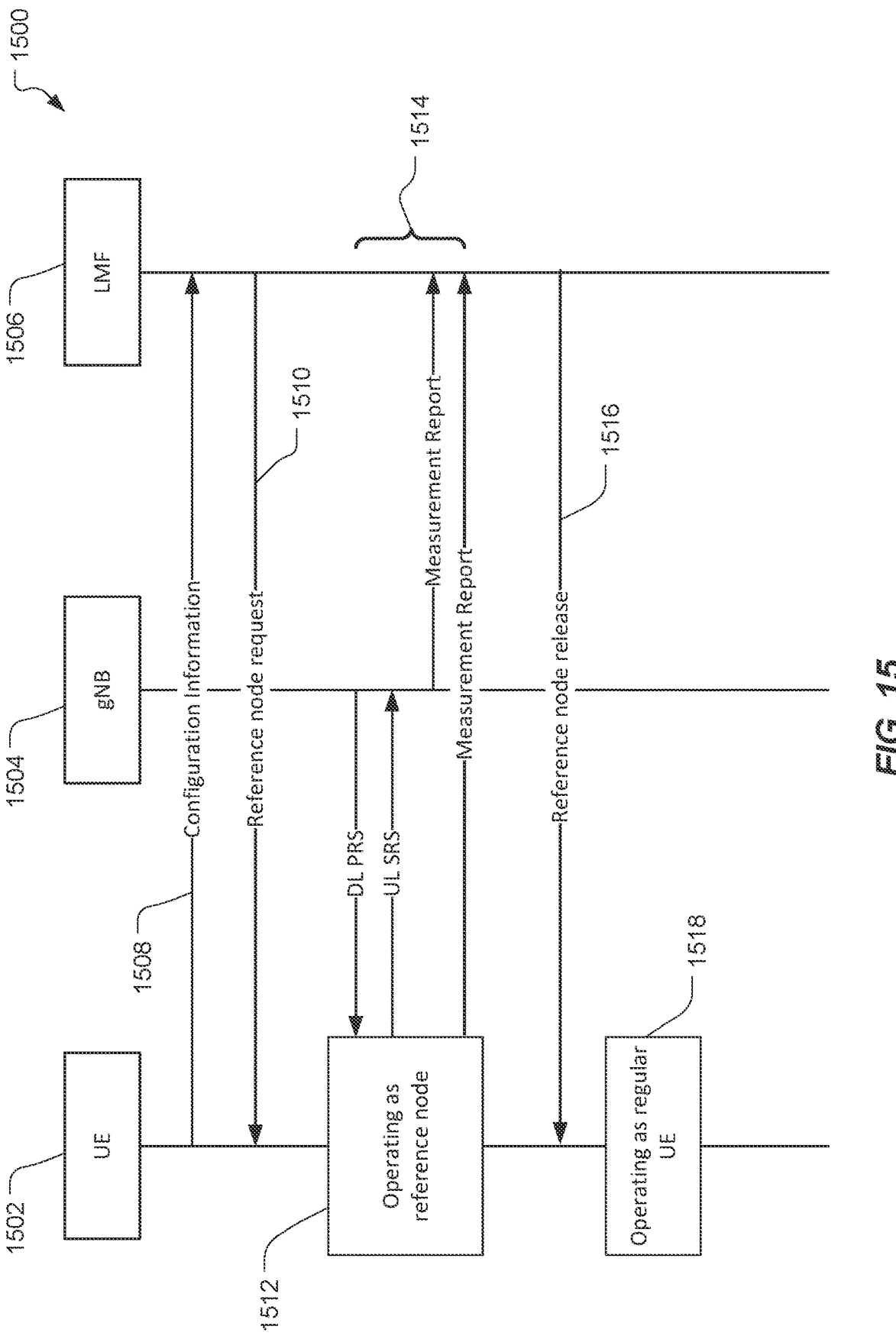
FIG. 15 is an example message flow for configuring a user equipment to operate as a reference node.

Referring to FIG. 15, with further reference to FIGS. 13 and 14, an example message flow 1500 for configuring a user equipment to operate as a reference node is shown. The message flow 1500 may be utilized by the communication network 100, and may include a UE 1502, a base station 1504, and a network server 1506. The UE 1502 may include some or all of the components of the UE 200, and the UE 200 may be an example of the UE 1502. The base station 1504 may include some or all of the components of the TRP 300, and the TRP 300 may be an example of the base station 1504. In an embodiment, the base station 1504 is a gNB such as the gNB 100a. The network server 1506 may include some or all of the components of the server 400, and the server 400 is an example of the network server 1506. The network server 1506 may be a LMF, such as the LMF 120. The message flow 1500 may utilize network messaging protocols such as LPP, NRPP, RRC, MAC-CE, DCI, and other protocols to send and receive reference node configuration options to and from the UE 1502. In an embodiment, the base station 1504 and the network server 1506 may be combined such that the base station 1504 is configured to perform the functions of the network server 1506.

In an example, the UE 1502 may be configured to send one or more configuration information messages 1508 to the network server 1506. The configuration information messages 1508 may indicate one or more configuration options 1402 and associated parameters 1404, 1406 that the UE 1502 is capable of while operating in the respective regular and reference node modes. The network server 1506 may determine that an additional reference node is required in a communication network and select the UE 1502 to operate as a reference node. In an embodiment, the network server 1506 may be configured to send one or more reference node request messages 1510. The reference node request messages 1510 may include a general indication for the UE 1502 to begin operating as a reference node. In an example, the reference node request messages 1510 may indicate a period of time for the UE 1502 to remain in the reference node mode 1304. The reference node request messages 1510 may include parameter values associated with one or more configuration options 1402. In an embodiment, the network server 1506 may send the reference node request messages 1510 to the base station 1504, and the base station 1504 may be configured to activate the reference node mode on the UE 1502 (e.g., via RRC, MAC-CE, DCI). At stage 1512, the UE 1502 may be configured to operate in the reference node mode 1304 and exchange reference signals and measurement values 1514 such as DL PRS and UL SRS with one or more base stations 1504 (other base stations are not depicted in FIG. 15). The base station 1504 and the UE 1502 may be configured to provide measurement reports to the network server 1506. In an example, the UE 1502 may be configured to operate as the reference node 1210 in the double difference positioning method of FIG. 12. Other positioning methods and reference signals may also be used at stage 1512.

In an embodiment, the UE 1502 may receive a reference node release message 1516 from the network server 1506 and/or the base station 1504 and then resume regular mode at stage 1518. In an example, RRC, MAC-CE, DCI based messages may be used to instruct the UE 1502 to exit the reference node mode 1304 and start the regular mode 1302. In an example, the transition to the regular mode 1302 at stage 1518 may be based on a time period/time duration value included in the reference node request message 1510. The message flow 1500 is an example, and not a limitation as other messages may also be used to configure the UE 1502 to transition between the regular mode 1302 and the reference node mode 1304.

Referring to FIG. 16, with further reference to FIGS. 1-15, a method 1600 for operating in a reference node mode includes the stages shown. The method 1600 is, however, an example and not limiting. The method 1600 may be altered, e.g., by having stages added, removed, rearranged, combined, performed concurrently, and/or having single stages split into multiple stages.

At stage 1602, the method includes providing an indication of one or more reference node configuration options to a network entity, the reference node configuration options comprising a registration configuration option indicating the user equipment is registered on a network as a reference node and a regular user equipment. A UE 200, including the transceiver 215 and the processor 230, may be a means for providing the indication of reference node configuration options. The UE 200 may have a plurality of configurable parameters associated with the operational capabilities of the UE 200 such as data processing, signal measurement, network registration, frequency band, signal prioritization, application and memory prioritization, and other processor and signal processing capabilities. The UEs in a network may have different capabilities and configuration options based on manufacturer, model, software, or other form and function differences (e.g., presence of peripheral devices, enclosures (casings), cradle, electrical charger, etc.). In an embodiment, the configuration options for the UE may be limited based on a state of the UE such as battery power level, temperature, proximity to a user (e.g., presence detection/transmit power limits), user validation, and network registration. The UE 200 may be configured to provide one or more configuration messages 1508 to a network entity such as a gNB (e.g., the base station 1504) or a positioning server (e.g., the network server 1506). The configuration messages 1508 may include an indication of the configuration options 1402 and the associated regular mode and reference node mode parameters 1404, 1406. In an example, the network entity may have the configuration options stored in a data structure (e.g., almanac) and indexed based on a UE identification value, UE model number, or other identification information to associate the UE 200 with the configuration options.

At stage 1604, the method includes receiving an indication to obtain positioning measurements based on the one or more reference node configuration options. The UE 200, including the transceiver 215 and the processor 230, may be a means for receiving the indication to obtain positioning measurements. The reference node configuration options may be based on the configuration options 1402 and the corresponding reference node parameters 1406. The UE 200 may receive a reference node request message 1510 from a network entity such as a gNB (e.g., the base station 1504) and/or a positioning server (e.g., the network server 1506). In an example, the reference node request messages 1510 may include a general indication for the UE 200 to begin operating as a reference node and may indicate a period of time for the UE 200 to remain in the reference node mode 1304. In an embodiment, the reference node request messages 1510 may include parameter values associated with one or more configuration options 1402. The gNB may be configured to activate the reference node mode on the UE 200 via one or more RRC, MAC-CE, or DCI messages, and the UE 200 may be configured to utilize the reference node parameters 1406 (e.g., configuration options) stored locally in the memory 211.

At stage 1606, the method includes obtaining one or more positioning measurements. The UE 200, including the transceiver 215 and the processor 230, may be a means for obtaining one or more positioning measurements. The positioning measurements may include ToA, TDoA, RSTD, RTT, RSSI RSRP, RSRQ, or other measurements obtained from reference signals transmitted by network stations such as gNBs or other stations. The reference signals may be PRS, NRS, TRS, CRS, CSI-RS, PSS, SSS, or other signals that can be used for positioning. In an embodiment, the UE 200 may be configured to obtain positioning measurements from other UEs and stations (e.g., RSU) via sidelink channels (e.g., PSCCH, PSSCH, or other sidelink channels). Upon receipt of the indication at stage 1604, the UE 200 may enter the reference node mode 1304 and obtained the positioning measurements based on the reference node parameters 1406. For example, the UE 200 may obtain the positioning measurements based on the frequency band configuration option 1418, or obtain the measurements in a MGP based on the measurement gap configuration option 1420, or obtain multiple measurements based on the multiple measurements configuration option 1414. The UE 200 may obtain the positioning measurements based on other configuration options associated with the reference node mode 1304.

At stage 1608, the method includes reporting the one or more positioning measurements to a positioning entity. The UE 200, including the transceiver 215 and the processor 230, may be a means for reporting the one or more positioning measurements. The UE 200 may be configured to provide measurement reports to a positioning entity such as the base station 1504 or the network server 1506 for use in a positioning method. For example, the positioning measurements may be used to support various positioning methods such as a double difference positioning method (FIG. 12), a ToA method (FIG. 8), a RTT method (FIG. 9), a passive positioning method (FIG. 10), and other positioning methods as known in the art. In an embodiment, the UE 200 may be configured to exit the reference node mode 1304 after a duration of time or based on a trigger event. For example, the trigger event may be receiving a reference node release message 1516, detecting movement of the UE 200, or detecting a signal drop (e.g., as caused by an obstruction). Other triggers may also be used to exit the reference node mode 1304 and enter the regular mode 1302.

Referring to FIG. 17, with further reference to FIGS. 1-15, a method 1700 for instructing a user equipment to operate in a reference node mode includes the stages shown. The method 1700 is, however, an example and not limiting. The method 1700 may be altered, e.g., by having stages added, removed, rearranged, combined, performed concurrently, and/or having single stages split into multiple stages. For example, providing an instruction to operate a UE in regular mode at stage 1708 is optional.

At stage 1702, the method includes receiving reference node configuration options from a user equipment. A server 400 such as the LMF 120, including the transceiver 415 and the processor 410, are a means for receiving the reference node configuration options. In an example, referring to FIG. 15, the UE 1502 may have a plurality of configurable parameters associated with the operational capabilities such as data processing, signal measurement, network registration, frequency band, signal prioritization, application and memory prioritization, and other processor and signal processing capabilities. The UEs in a network may have different capabilities and configuration options based on manufacturer, model, software, device state, or other form and function differences (e.g., presence of peripheral devices, enclosure (casings), cradle, electrical charger, etc.). A network entity such as the base station 1504 or the network server 1506 may be configured to receive one or more configuration messages 1508 from the UE 1502. The configuration messages 1508 may include an indication of the configuration options 1402 and the associated regular mode and reference node mode parameters 1404, 1406 for the UE 1502. In an example, the network entity may have the configuration options stored in a data structure (e.g., almanac) and indexed based on a UE identification value, UE model number, or other identification information to associate the UE 1502 with the configuration options.

At stage 1704, the method includes providing an instruction to the user equipment to operate as a reference node based at least in part on the reference node configuration options. The server 400, including the transceiver 415 and the processor 410, are a means for providing the instruction to the UE to operate as a reference node. In operation, the network server 1506 may determine that an additional reference node will be required in a network. The network server 1506 may utilize location information and the configuration information associated with UEs in the network to select a UE to operate as a reference node. In an example, the network entity, such as the base station 1504 and the network server 1506, may send one or more reference node request messages 1510 configured to instruct a selected UE, such as the UE 1502, to operate in the reference node mode 1304. In an example, the reference node request message 1510 may include information elements associated with reference node configuration options such as the configuration options 1402 and the corresponding reference node parameters 1406. In another example, the reference node request messages 1510 may include a general indication for the UE 1502 to begin operating as a reference node (i.e., without an indication of the reference node parameters 1406). The reference node request message 1510 may indicate a period of time (e.g., 0.5, 1, 10, 100, seconds, number of frames, etc.) for the UE 1502 to remain in the reference node mode 1304. A gNB, such as the base station 1504, may be configured to activate the reference node mode on the UE 1502 via one or more RRC, MAC-CE, or DCI messages, and the UE 1502 may be configured to utilize locally stored reference node parameters 1406 (e.g., in the memory 211).

At stage 1706, the method includes receiving one or more reference signal measurement values from the user equipment. The server 400, including the transceiver 415 and the processor 410, are a means for receiving one or more reference signal measurement values. In an example, referring to FIG. 15, the UE 1502 may be configured to operate as a reference node at stage 1512 to measure reference signals and provide the measurements to a positioning entity such as the base station 1504 or the network server 1506 for use in a positioning method. The positioning measurements may include ToA, TDoA, RSTD, RTT, RSSI RSRP, RSRQ, or other measurements obtained from reference signals transmitted by network stations such as gNBs or other stations (e.g., other UEs via sidelink). The positioning measurements may be based on various positioning methods such as a double difference positioning method (FIG. 12), a ToA method (FIG. 8), a RTT method (FIG. 9), a passive positioning method (FIG. 10), and other positioning methods as known in the art.

At stage 1708, the method optionally includes providing an instruction to the user equipment to operate in a regular user equipment mode. The server 400, including the transceiver 415 and the processor 410, are a means for providing an instruction to the UE. In an embodiment, a network entity such as a gNB or LMF may be configured to send a reference node release message 1516 to UE 1502 to instruct the UE 1502 to enter the regular mode 1302. The UE 1502 may also be configured to exit the reference node mode 1304 after a duration of time or based on another trigger event such as detecting movement of the UE 1502, or detecting a signal drop (e.g., as caused by an obstruction). Other triggers may also be used to exit the reference node mode 1304 and enter the regular mode 1302.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300 or the UE 200.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method of operating a user equipment as a reference node, comprising: providing an indication of one or more reference node configuration options to a network entity, the one or more reference node configuration options comprising a registration configuration option indicating the user equipment is registered on a network as a reference node and a regular user equipment; receiving an indication to obtain positioning measurements based on the one or more reference node configuration options; obtaining one or more positioning measurements; and reporting the one or more positioning measurements to a positioning entity.

Clause 2. The method of clause 1 wherein the one or more reference node configuration options further comprise a data processing configuration option indicating a decode rate of the user equipment.

Clause 3. The method of clause 1 wherein the one or more reference node configuration options further comprise a multiple measurement configuration option indicating the user equipment is configured to obtain multiple positioning measurements simultaneously.

Clause 4. The method of clause 1 wherein the indication to obtain measurements includes an on-demand request via a Medium Access Control (MAC) Control Element (CE) configured to active the user equipment as a reference node.

Clause 5. The method of clause 1 wherein the one or more reference node configuration options further comprise a frequency band configuration option indicating one or more frequency bands to utilize for obtaining the one or more positioning measurements.

Clause 6. The method of clause 1 wherein the one or more reference node configuration options further comprise a measurement gap period configuration option indicating a measurement gap period for obtaining the one or more positioning measurements.

Clause 7. The method of clause 1 wherein the one or more reference node configuration options further comprise a sounding reference signal for positioning configuration option indicating the user equipment will transmit a sounding reference signal for positioning during a measurement gap period.

Clause 8. The method of clause 1 wherein the one or more reference node configuration options further comprise a prioritized positioning reference signal configuration option indicating that the user equipment will prioritize receiving positioning reference signals over radio resource management messages.

Clause 9. The method of clause 1 wherein the one or more reference node configuration options further comprise a background mode configuration option indicating the user equipment will only report the one or more positioning measurements when there is relative signal loss of 3 decibels or greater compared to a prior measurement.

Clause 10. The method of clause 1 wherein the indication to obtain the positioning measurements based on the one or more reference node configuration options includes a time duration.

Clause 11. A method for instructing a user equipment to operate in a reference node mode, comprising: receiving reference node configuration options from the user equipment; providing an instruction to the user equipment to operate as a reference node based at least in part on the reference node configuration options; and receiving one or more reference signal measurement values from the user equipment.

Clause 12. The method of clause 11 wherein the reference node configuration options include a data processing configuration option indicating a decode rate of the user equipment.

Clause 13. The method of clause 11 wherein the reference node configuration options include a multiple measurement configuration option indicating the user equipment is configured to obtain multiple positioning measurements simultaneously.

Clause 14. The method of clause 11 wherein the reference node configuration options include a registration configuration option indicating the user equipment is registered on a network as a reference node and a regular user equipment simultaneously.

Clause 15. The method of clause 11 wherein the reference node configuration options include a frequency band configuration option indicating one or more frequency bands the user equipment will utilize to obtain positioning measurements.

Clause 16. The method of clause 11 wherein the reference node configuration options include a measurement gap period configuration option indicating a measurement gap period for obtaining the one or more positioning measurements.

Clause 17. The method of clause 11 wherein the reference node configuration options include a sounding reference signal for positioning configuration option indicating the user equipment will transmit a sounding reference signal for positioning during a measurement gap period.

Clause 18. The method of clause 11 wherein the reference node configuration options include a prioritized positioning reference signal configuration option indicating that the user equipment will prioritize receiving positioning reference signals over radio resource management messages.

Clause 19. The method of clause 11 wherein the reference node configuration options include a background mode configuration option indicating the user equipment will only report positioning measurements when there is relative signal loss of 3 decibels or greater compared to a prior measurement.

Clause 20. The method of clause 11 wherein the instruction to the user equipment to operate as the reference node includes a time duration.

Clause 21. The method of clause 11 wherein the instruction to the user equipment to operate as the reference node is included in at least one of a radio resource control message, a medium access control control element, and a downlink control information message.

Clause 22. The method of clause 11 further comprising providing an instruction to the user equipment to operate in a regular user equipment mode.

Clause 23. An apparatus, comprising: a memory; at least one transceiver; at least one processor communicatively coupled to the memory and the at least one transceiver, and configured to: provide an indication of one or more reference node configuration options to a network entity, the one or more reference node configuration options comprising a registration configuration option indicating the apparatus is registered on a network as a reference node and a regular user equipment; receive an indication to obtain positioning measurements based on the one or more reference node configuration options; obtain one or more positioning measurements; and report the one or more positioning measurements to a positioning entity.

Clause 24. The apparatus of clause 22 wherein the one or more reference node configuration options further comprise a data processing configuration option indicating a decode rate of the apparatus.

Clause 25. The apparatus of clause 22 wherein the one or more reference node configuration options further comprise a multiple measurement configuration option indicating the apparatus is configured to obtain multiple positioning measurements simultaneously.

Clause 26. The apparatus of clause 22 wherein the one or more reference node configuration options further comprise a frequency band configuration option indicating one or more frequency bands to utilize for obtaining the one or more positioning measurements.

Clause 27. An apparatus, comprising: a memory; at least one transceiver; at least one processor communicatively coupled to the memory and the at least one transceiver, and configured to: receive reference node configuration options from a user equipment; provide an instruction to the user equipment to operate as a reference node based at least in part on the reference node configuration options; and receive one or more reference signal measurement values from the user equipment.

Clause 28. The apparatus of clause 27 wherein the reference node configuration options include a sounding reference signal for positioning configuration option indicating the user equipment will transmit a sounding reference signal for positioning during a measurement gap period.

Clause 29. The apparatus of clause 27 wherein the instruction to the user equipment to operate as the reference node includes a time duration.

Clause 30. The apparatus of clause 27 wherein the at least one processor is further configured to provide an instruction to the user equipment to operate in a regular user equipment mode.

Clause 31. An apparatus for operating as a reference node, comprising: means for providing an indication of one or more reference node configuration options to a network entity; means for receiving an indication to obtain positioning measurements based on the one or more reference node configuration options; means for obtaining one or more positioning measurements; and means for reporting the one or more positioning measurements to a positioning entity.

Clause 32. An apparatus for instructing a user equipment to operate in a reference node mode, comprising: means for receiving reference node configuration options from the user equipment; means for providing an instruction to the user equipment to operate as a reference node based at least in part on the reference node configuration options; and means for receiving one or more reference signal measurement values from the user equipment.

Clause 33. A non-transitory processor-readable storage medium comprising processor-readable instructions configured to cause one or more processors to operate a user equipment as a reference node, comprising: code for providing an indication of one or more reference node configuration options to a network entity; code for receiving an indication to obtain positioning measurements based on the one or more reference node configuration options; code for obtaining one or more positioning measurements; and reporting the one or more positioning measurements to a positioning entity.

Clause 34. A non-transitory processor-readable storage medium comprising processor-readable instructions configured to cause one or more processors to instruct a user equipment to operate in a reference node mode, comprising: code for receiving reference node configuration options from the user equipment; code for providing an instruction to the user equipment to operate as a reference node based at least in part on the reference node configuration options; and code for receiving one or more reference signal measurement values from the user equipment.

The invention claimed is:

1. A method of operating a user equipment as a reference node, comprising:
   providing an indication of one or more reference node configuration options to a network entity, the one or more reference node configuration options comprising a registration configuration option indicating the user equipment is registered on a network as a reference node and a regular user equipment;
   receiving an indication to obtain positioning measurements based on the one or more reference node configuration options, wherein the indication to obtain positioning measurements includes an on-demand request via a Medium Access Control (MAC) Control Element (CE) configured to activate the user equipment as a reference node;
   obtaining one or more positioning measurements; and
   reporting the one or more positioning measurements to a positioning entity.

2. The method of claim 1 wherein the one or more reference node configuration options further comprise a data processing configuration option indicating a decode rate of the user equipment.

3. The method of claim 1 wherein the one or more reference node configuration options further comprise a multiple measurement configuration option indicating the user equipment is configured to obtain multiple positioning measurements simultaneously.

4. The method of claim 1 wherein the one or more reference node configuration options further comprise a frequency band configuration option indicating one or more frequency bands to utilize for obtaining the one or more positioning measurements.

5. The method of claim 1 wherein the one or more reference node configuration options further comprise a measurement gap period configuration option indicating a measurement gap period for obtaining the one or more positioning measurements.

6. The method of claim 1 wherein the one or more reference node configuration options further comprise a sounding reference signal for positioning configuration option indicating the user equipment will transmit a sounding reference signal for positioning during a measurement gap period.

7. A method of operating a user equipment as a reference node, comprising:
   providing an indication of one or more reference node configuration options to a network entity, the one or more reference node configuration options comprising a registration configuration option indicating the user equipment is registered on a network as a reference node and a regular user equipment;
   receiving an indication to obtain positioning measurements based on the one or more reference node configuration options;
   obtaining one or more positioning measurements; and
   reporting the one or more positioning measurements to a positioning entity,
   wherein the one or more reference node configuration options further comprise a prioritized positioning reference signal configuration option indicating that the user equipment will prioritize receiving positioning reference signals over radio resource management messages.

8. The method of claim 1 wherein the one or more reference node configuration options further comprise a background mode configuration option indicating the user equipment will only report the one or more positioning measurements when there is relative signal loss of 3 decibels or greater compared to a prior measurement.

9. The method of claim 1 wherein the indication to obtain the positioning measurements based on the one or more reference node configuration options includes a time duration.

10. A method for instructing a user equipment to operate in a reference node mode, comprising:
   receiving reference node configuration options from the user equipment, wherein the reference node configuration options include a prioritized positioning reference signal configuration option indicating that the user equipment will prioritize receiving positioning reference signals over radio resource management messages;
   providing an instruction to the user equipment to operate as a reference node based at least in part on the reference node configuration options; and
   receiving one or more reference signal measurement values from the user equipment.

11. The method of claim 10 wherein the reference node configuration options include a data processing configuration option indicating a decode rate of the user equipment.

12. The method of claim 10 wherein the reference node configuration options include a multiple measurement configuration option indicating the user equipment is configured to obtain multiple positioning measurements simultaneously.

13. The method of claim 10 wherein the reference node configuration options include a registration configuration option indicating the user equipment is registered on a network as a reference node and a regular user equipment simultaneously.

14. The method of claim 10 wherein the reference node configuration options include a frequency band configuration option indicating one or more frequency bands the user equipment will utilize to obtain positioning measurements.

15. The method of claim 10 wherein the reference node configuration options include a measurement gap period configuration option indicating a measurement gap period for obtaining the one or more positioning measurements.

16. The method of claim 10 wherein the reference node configuration options include a sounding reference signal for positioning configuration option indicating the user equipment will transmit a sounding reference signal for positioning during a measurement gap period.

17. The method of claim 10 wherein the reference node configuration options include a background mode configuration option indicating the user equipment will only report positioning measurements when there is relative signal loss of 3 decibels or greater compared to a prior measurement.

18. The method of claim 10 wherein the instruction to the user equipment to operate as the reference node includes a time duration.

19. The method of claim 10 wherein the instruction to the user equipment to operate as the reference node is included in at least one of a radio resource control message, a Medium Access Control (MAC) Control Element (CE), and a downlink control information message.

20. The method of claim 10 further comprising providing an instruction to the user equipment to operate in a regular user equipment mode.

21. An apparatus, comprising:
a memory;
at least one transceiver;
at least one processor communicatively coupled to the memory and the at least one transceiver, and configured to:
provide an indication of one or more reference node configuration options to a network entity, the one or more reference node configuration options comprising a registration configuration option indicating the apparatus is registered on a network as a reference node and a regular user equipment;

receive an indication to obtain positioning measurements based on the one or more reference node configuration options, wherein the indication to obtain positioning measurements includes an on-demand request via a Medium Access Control (MAC) Control Element (CE) configured to activate the user equipment as a reference node;
obtain one or more positioning measurements; and
report the one or more positioning measurements to a positioning entity.

22. The apparatus of claim 21 wherein the one or more reference node configuration options further comprise a data processing configuration option indicating a decode rate of the apparatus.

23. The apparatus of claim 21 wherein the one or more reference node configuration options further comprise a multiple measurement configuration option indicating the apparatus is configured to obtain multiple positioning measurements simultaneously.

24. The apparatus of claim 21 wherein the one or more reference node configuration options further comprise a frequency band configuration option indicating one or more frequency bands to utilize for obtaining the one or more positioning measurements.

25. An apparatus, comprising:
a memory;
at least one transceiver;
at least one processor communicatively coupled to the memory and the at least one transceiver, and configured to:
receive reference node configuration options from a user equipment, wherein the reference node configuration options include a prioritized positioning reference signal configuration option indicating that the user equipment will prioritize receiving positioning reference signals over radio resource management messages;
provide an instruction to the user equipment to operate as a reference node based at least in part on the reference node configuration options; and
receive one or more reference signal measurement values from the user equipment.

26. The apparatus of claim 25 wherein the reference node configuration options include a sounding reference signal for positioning configuration option indicating the user equipment will transmit a sounding reference signal for positioning during a measurement gap period.

27. The apparatus of claim 25 wherein the instruction to the user equipment to operate as the reference node includes a time duration.

28. The apparatus of claim 25 wherein the at least one processor is further configured to provide an instruction to the user equipment to operate in a regular user equipment mode.

* * * * *